United States Patent [19]

Iwanami et al.

[11] Patent Number: 5,106,564
[45] Date of Patent: Apr. 21, 1992

[54] METHOD OF AND APPARATUS FOR MAKING FIBER-REINFORCED POLYMER COMPOSITIONS

[75] Inventors: Kunio Iwanami; Kissho Kitano, both of Ooi; Kiyotada Narukawa, Tokorozawa; Kenichi Aoki, Yokohama; Yukihiko Yagi, Ooi; Masato Sakuma, Urawa; Takashi Mikami, Komae; Masami Esaki, Toyota; Fumio Kato, Kariya; Koji Egashira, Oobu; Hiroyuki Wakabayashi, Kariya, all of Japan

[73] Assignees: Tonen Sekiyukagaku Kabushiki Kaisha, Tokyo; Nippondenso Co., Ltd., Aichi, both of Japan

[21] Appl. No.: 636,028

[22] Filed: Jan. 4, 1991

Related U.S. Application Data

[62] Division of Ser. No. 325,812, Mar. 20, 1989, Pat. No. 4,990,550.

[30] Foreign Application Priority Data

| Mar. 18, 1988 | [JP] | Japan | 63-65453 |
| Mar. 18, 1988 | [JP] | Japan | 63-65454 |
| Mar. 18, 1988 | [JP] | Japan | 63-65455 |
| Mar. 18, 1988 | [JP] | Japan | 63-65456 |
| Apr. 28, 1988 | [JP] | Japan | 63-106864 |
| Jul. 12, 1988 | [JP] | Japan | 63-173518 |
| Jul. 12, 1988 | [JP] | Japan | 63-173519 |
| Jul. 12, 1988 | [JP] | Japan | 63-173520 |
| Jul. 12, 1988 | [JP] | Japan | 63-173521 |
| Jul. 12, 1988 | [JP] | Japan | 63-173522 |

[51] Int. Cl.⁵ .......... B29C 47/40; B29C 47/76
[52] U.S. Cl. .......... 264/211.23; 264/349; 425/203; 425/204; 425/208
[58] Field of Search .......... 264/142, 143, 211.23, 264/349; 425/203, 204, 208, 812

[56] References Cited

U.S. PATENT DOCUMENTS

| 3,409,711 | 11/1968 | Pashak et al. | 264/143 |
| 3,453,356 | 7/1969 | Kent, Jr. et al. | 264/143 |
| 4,381,366 | 4/1983 | Sanderson et al. | 524/504 |
| 4,404,312 | 9/1983 | Kokubu et al. | 524/504 |
| 4,762,882 | 9/1988 | Okano et al. | 525/74 |
| 4,895,688 | 1/1990 | Shigetani et al. | 264/211.23 X |

FOREIGN PATENT DOCUMENTS

| 59-101318 | 6/1984 | Japan | 264/211.23 |
| 60-58458 | 4/1985 | Japan . | |
| 60-141519 | 7/1985 | Japan | 264/211.23 |
| 60-170664 | 9/1985 | Japan . | |
| 61-76540 | 4/1986 | Japan . | |
| 61-26939 | 6/1986 | Japan . | |
| 62-113514 | 5/1987 | Japan | 425/204 |
| 62-147299 | 7/1987 | Japan . | |
| 62-241940 | 10/1987 | Japan . | |

OTHER PUBLICATIONS

English-Language Translation of Japanese Reference 59-101,318 (Published Jun. 11, 1984).

Primary Examiner—Leo B. Tentoni
Attorney, Agent, or Firm—Armstrong, Nikaido, Marmelstein, Kubovcik, & Murray

[57] ABSTRACT

Fiber-reinforced polymer compositions containing resin components including (a) 30–90 weight % of polyamide resins, and (b) 10–70 weight % of polyolefins+unsaturated carboxylic acid-modified polyolefins, based on the resin components; and (c) 5–50 parts by weight of glass fibers per 100 parts by weight of the total compositions, a molar ratio of end amino groups in the polyamide resins to carboxyl groups in the modified polyolefins being 10–1000. The compositions have a morphology in which polyolefin domains having an average size of 0.5–5 μm are uniformly dispersed in polyamide matrix phases. They are produced by a double-screw extruder having a length/inner diameter (L/D) ratio of 25 or more and having a first hopper for introducing the resin components, a second hopper for introducing the glass fibers, a vent and a die exit in this order, and further having at least one first kneading zone for strongly kneading the resin components, and at least one second kneading zone disposed between the second hopper and the vent for strongly kneading the resin components and the glass fibers.

6 Claims, 1 Drawing Sheet

METHOD OF AND APPARATUS FOR MAKING FIBER-REINFORCED POLYMER COMPOSITIONS

This is a division, of application Ser. No. 07/325,812 filed Mar. 20, 1989 now U.S. Pat. No. 4,990,550.

BACKGROUND OF THE INVENTION

The present invention relates to fiber-reinforced polymer compositions comprising polyamide resins and polyolefins as main components, and more particularly to fiber-reinforced polymer compositions comprising polyamide resins and polyolefins as main components, which have excellent thermal deformation resistance, chemical resistance, impact resistance, antifreeze resistance, water absorption resistance and moldability, and further remarkably improved tensile strength, flexural modulus, creep resistance, etc. depending upon their additives.

Containers such as radiator tanks of automobiles are increasingly produced from plastics, for the purpose of reducing their weight. As plastic materials for producing such containers, polyamide resins are highly suitable because they are light and excellent in impact resistance, heat resistance, chemical resistance, etc. Particularly, nylon 6 and nylon 66 have excellent strength and heat resistance and when blended with glass fibers are widely used.

However, despite the fact that polyamide resins reinforced with glass fibers, etc. are excellent in heat resistance, mechanical strength and long-term durability, they are generally poor in water resistance, moldability, chemical resistance and antifreeze resistance. Particularly, the antifreeze resistance is an important characteristic when they are used for radiator tanks of automobiles.

The above desired properties, which are insufficient in the polyamide resins, are generally present in polyolefins. Thus, various compositions based on polyamide resins, polyolefins and glass fibers have been proposed.

Japanese Patent Publication No. 61-26939 discloses radiator tanks made of compositions comprising (a) polyamide resins, (b) modified polymers obtained by grafting ethylenically unsaturated carboxylic acids or their anhydrides to polypropylene resins, and (c) fibrous reinforcing materials, a weight ratio of the component (a) to the component (b) being 70:30-95:5, and the component (c) being 40-200 parts by weight per 100 parts by weight of the total amount of the component (a) and the component (b).

Japanese Patent Laid-Open No. 61-76540 discloses molded plastic articles for automobiles having one surface exposed to the atmosphere and the other surface exposed to water and being repeatedly subjected to high temperature, the molded articles being made of (A) 90-10 parts by weight of olefin polymers, (B) 10-90 parts by weight of polyamides, and (C) 0.1-20 parts by weight, per 100 parts by weight of (A)+(B), of modified olefin polymers grafted with 0.05-10 parts by weight of monomers selected from unsaturated carboxylic acids or their derivatives.

Japanese Patent Laid-Open No. 62-241940 discloses plastic compositions for radiator tanks for automobiles comprising (A) 30-95 weight % of olefin polymers, (B) 5-70 weight % of polyamides, and (C) 5-200 parts by weight, per 100 parts by weight of (A)+(B), of glass fibers impregnated with acrylic resins as tying agents.

These polyamide compositions may be produced by any known methods, for instance, by methods using a Henschel mixer, a V-blender, a single-screw extruder, a vented extruder, a double-screw extruder, a kneader, etc.

However, despite the fact that in the conventional compositions, the compatibility of polyamide resins and polyolefins and the adhesion of glass fibers to the matrix resins are improved, they are still insufficient for severe conditions required for radiator tanks, etc.

Further, since the polyolefin components are vulnerable to C-C chain scission when exposed at high temperature, resulting in the deterioration of their mechanical properties, it is desired to prevent the oxidation deterioration of the compositions at high temperature as part materials used in a high-temperature environment near engines.

In addition, since polyolefins have relatively high brittle temperatures, it is desired to improve the low-temperature impact resistance of their compositions.

OBJECT AND SUMMARY OF THE INVENTION

An object of the present invention is, therefore, to provide fiber-reinforced polymer compositions having excellent water resistance, moldability and antifreeze resistance owned by polyolefins while retaining excellent properties such as thermal deformation resistance of the polyamide resins, desirably with such properties further improved.

Another object of the present invention is to provide fiber-reinforced polymer compositions further provided with thermal deterioration resistance and low-temperature impact resistance in addition to the above properties.

A further object of the present invention is to provide fiber-reinforced polymer compositions having improved bonding strength between glass fibers and matrix resins.

A still further object of the present invention is to provide fiber-reinforced polymer compositions provided with remarkably improved impact resistance and flexural modulus.

A still further object of the present invention is to provide fiber-reinforced polymer compositions provided with remarkably improved heat resistance and creep resistance.

A still further object of the present invention is to provide fiber-reinforced polymer compositions provided with remarkably improved moldability, antifreeze resistance, chemical resistance and water resistance.

A still further object of the present invention is to provide a method and an apparatus for industrially and stably producing such fiber-reinforced polymer compositions with improved properties.

As a result of intense research in view of the above objects, the inventors have found that the fiber-reinforced polymer compositions with the above improved properties can be obtained by adding unsaturated carboxylic acid-modified polyolefins to polyamide resins, polyolefins and glass fibers.

It has also been found that by selecting a molar ratio of end amino groups of polyamide resins to carboxyl groups of modified polyolefins by the addition of a proper amount of unsaturated carboxylic acid-modified polyolefins to compositions of polyamide resins, polyolefins and glass fibers, the compatibility between polyamide resins and polyolefins is considerably improved, thus providing fiber-reinforced polymer compositions having excellent properties peculiar to both components.

It has further been found that by forming a particular morphology in which fine polyolefin domain phases are uniformly dispersed in a polyamide resin matrix phase by the addition of unsaturated carboxylic acid-modified polyolefins to polyamide resins, polyolefins and glass fibers, the fiber-reinforced polymer compositions can exhibit water resistance, moldability and antifreeze resistance peculiar in polyolefins at maximum levels while retaining thermal deformation resistance of the polyamide resins.

Further, it has been found that not only by adding a proper amount of unsaturated carboxylic acid-modified polyolefins to compositions of polyamide resins, polyolefins and glass fibers, but also by treating the glass fibers with particular tying agents and coupling agents, improved bonding strength between the glass fibers and matrix resins can be achieved, thereby providing the resulting fiber-reinforced polymer compositions with improved properties.

Further, it has been found that not only by adding a proper amount of unsaturated carboxylic acid-modified polyolefins to compositions of polyamide resins, polyolefins and glass fibers, but also by adding inorganic fillers in the form of a sphere, flake or fine fiber, such as talc, mica, potassium titanate, etc., the resulting fiber-reinforced polymer compositions can be provided with further improved mechanical properties.

Further, it has been found that not only by adding a proper amount of unsaturated carboxylic acid-modified polyolefins to compositions of polyamide resins, polyolefins and glass fibers, but also by adding nucleating agents thereto, the resulting fiber-reinforced polymer compositions can be provided with remarkably improved impact resistance and modulus.

Further, it has been found that not only by adding a proper amount of unsaturated carboxylic acid-modified polyolefins to compositions of polyamide resins, polyolefins and glass fibers, but also by using, as polyamide resins, nylon 66 and nylon 6 at a nylon 66/nylon 6 weight ratio of 40/60-90/10, the crystallinities of polyamide resins are reduced, and their compatibility with polyolefins is improved, thereby providing the resulting fiber-reinforced polymer compositions with remarkably improved ductility and impact resistance.

Further, it has been found that not only by adding a proper amount of unsaturated carboxylic acid-modified polyolefins to compositions of polyamide resins, polyolefins and glass fibers, but also by using nylon 46 as a polyamide resin, the resulting fiber-reinforced polymer compositions can be provided with remarkably improved heat resistance, mechanical strength and creep resistance.

Further, it has been found that not only by adding a proper amount of unsaturated carboxylic acid-modified polyolefins to compositions of polyamide resins, polyolefins and glass fibers, but also by using the polyamide resins including nylon 12, nylon 612 or nylon 11, the resulting fiber-reinforced polymer compositions can be provided with further improved antifreeze resistance, chemical resistance, moldability and water absorption resistance.

Further, it has been found that by using a double-screw extruder having a hopper for introducing resin components of polyamide resins and polyolefins and a hopper for introducing glass fibers and a vent, and by providing the extruder with a first kneading zone for blending the resin components and a second kneading zone for blending the resin components with the glass fibers to achieve sufficient blending, it is possible to produce fiber-reinforced polymer compositions exhibiting water resistance, moldability and antifreeze resistance peculiar in polyolefins at maximum levels while retaining the thermal deformation resistance of the polyamide resins, and the resulting compositions can be stably pelletized by extrusion.

Thus, the fiber-reinforced polymer composition according to one embodiment of the present invention comprises resin components comprising (a) 30-90 weight % of a polyamide resin, and (b) 10-70 weight % of polyolefin+unsaturated carboxylic acid-modified polyolefin, based on the resin components; and (c) 5-50 parts by weight of glass fibers per 100 parts by weight of the entire composition.

The fiber-reinforced polymer composition according to another embodiment of the present invention comprises resin components comprising (a) 30-90 weight % of a polyamide resin, and (b) 10-70 weight % of polyolefin+unsaturated carboxylic acid-modified polyolefin, based on the resin components; and (c) 5-50 parts by weight of glass fibers per 100 parts by weight of the entire composition, a molar ratio of end amino groups in the polyamide resin to carboxyl groups in the unsaturated carboxylic acid-modified polyolefin being 10-1000.

The fiber-reinforced polymer composition according to a further embodiment of the present invention comprises resin components comprising (a) 30-90 weight % of a polyamide resin, and (b) 10-70 weight % of polyolefin+unsaturated carboxylic acid-modified polyolefin, based on the resin components; and (c) 5-50 parts by weight of glass fibers per 100 parts by weight of the entire composition, the polyamide resin constituting a continuous matrix phase, and the polyolefin constituting uniformly dispersed domain phases having an average size of 0.5-5 $\mu$m.

The fiber-reinforced polymer composition according to a still further embodiment of the present invention comprises resin components comprising (a) 30-90 weight % of a polyamide resin, and (b) 10-70 weight % of polyolefin+unsaturated carboxylic acid-modified polyolefin, based on the resin components; and (c) 5-50 parts by weight, per 100 parts by weight of the entire composition, of glass fibers coated with a silane coupling agent and a tying agent made of a carboxyl group- or acid anhydride group-containing polymer.

The fiber-reinforced polymer composition according to a still further embodiment of the present invention comprises resin components comprising (a) 30-90 weight % of a polyamide resin, and (b) 10-70 weight % of polyolefin+unsaturated carboxylic acid-modified polyolefin, based on the resin components; and (c) 5-50 parts by weight of glass fibers, and (d) 1-10 parts by weight of a spherical, flaky or fibrous inorganic filler, per 100 parts by weight of the entire composition.

The fiber-reinforced polymer composition according to a still further embodiment of the present invention comprises resin components comprising (a) 30-90 weight % of a polyamide resin, and (b) 10-70 weight % of polyolefin+unsaturated carboxylic acid-modified polyolefin, based on the resin components; and, per 100 parts by weight of the entire composition, (c) 5-50 parts by weight of glass fibers, and (d) 0.03-3 parts by weight of at least one nucleating agent selected from the group consisting of:

(1) a metal salt of aromatic carboxylic acid;
(2) a metal salt of an alkyl group-substituted derivative of aromatic carboxylic acid; and
(3) dibenzylidene sorbitol.

The fiber-reinforced polymer composition according to a still further embodiment of the present invention comprises resin components comprising (a) 30-90 weight % of a polyamide resin, and (b) 10-70 weight % of polyolefin + unsaturated carboxylic acid-modified polyolefin, based on the resin components; and (c) 5-50 parts by weight of glass fibers per 100 parts by weight of the entire composition; characterized in that the polyamide resin consists of nylon 66 and nylon 6 in a proportion (weight ratio) of 40/60-90/10.

The fiber-reinforced polymer composition according to a still further embodiment of the present invention comprises resin components comprising (a) 30-90 weight % of a polyamide resin, and (b) 10-70 weight % of polyolefin + unsaturated carboxylic acid-modified polyolefin, based on the resin components; and (c) 5-50 parts by weight of glass fibers per 100 parts by weight of the entire composition; characterized in that the polyamide resin consists of nylon 46.

The fiber-reinforced polymer composition according to a still further embodiment of the present invention comprises resin components comprising (a) 30-90 weight % of a polyamide resin, and (b) 10-70 weight % of polyolefin + unsaturated carboxylic acid-modified polyolefin, based on the resin components; and (c) 5-50 parts by weight of glass fibers per 100 parts by weight of the entire composition; characterized in that the polyamide resin consists of nylon 12, nylon 612 or nylon 11.

The method of producing a fiber-reinforced polymer composition according to the present invention comprises using a double-screw extruder having a first hopper, a second hopper, a vent and a die exit in this order and having a length/inner diameter (L/D) ratio of 25 or more; introducing resin components containing the polyamide resin, the polyolefin and the unsaturated carboxylic acid-modified polyolefin into the double-screw extruder through the first hopper; strongly kneading the resin components in at least one first kneading zone constituted by four or more continuously arranged kneading discs before reaching the second hopper; keeping the temperature of the resin components at 290°-320° C. on the upstream side of the second hopper; introducing the glass fibers through the second hopper; and strongly kneading the resin components with the glass fibers in at least one second kneading zone constituted by four or more continuously arranged kneading discs before reaching the vent.

The double-screw extruder for producing a fiber-reinforced polymer composition according to the present invention has a length/inner diameter (L/D) ratio of 25 or more, and comprises a first hopper for introducing resin components containing the polyamide resin, the polyolefin and the unsaturated carboxylic acid-modified polyolefin, a second hopper for introducing the glass fibers, a vent and a die exit in this order, and further comprises at least one first kneading zone located upstream of the second hopper and constituted by four or more continuously arranged kneading discs for strongly kneading the resin components, and at least one second kneading zone located between the second hopper and the vent and constituted by four or more continuously arranged kneading discs for strongly kneading the resin components and the glass fibers.

DETAILED DESCRIPTION OF THE INVENTION

Figure 1:
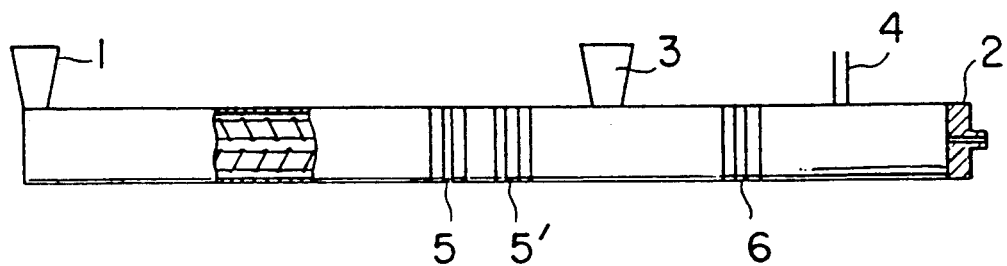
FIG. 1 is a partially cross-sectional schematic side view showing one example of a double-screw extruder for producing the fiber-reinforced polymer composition according to the present invention.

The polyamide resins which may be used in the present invention include polyamide resins formed from aliphatic, alicylic or aromatic diamines such as hexamethylenediamine, decamethylenediamine, dodecamethylenediamine, 2,2,4- or 2,4,4-trimethylhexamethylenediamine, 1,3- or 1,4-bis (aminomethyl) cyclohexane, bis (p-aminocyclohexylmethane), m- or p-xylylenediamine, etc., and aliphatic, alicyclic or aromatic dicarboxylic acids such as adipic acid, suberic acid, sebacic acid, cyclohexane carboxylic acid, telephthalic acid, isophthalic acid, etc.; polyamide resins formed from amino carboxylic acids such as 6-amino caproic acid, 11-amino undecanoic acid, 12-amino dodecanoic acid, etc.; polyamide resins formed from lactams such as $\epsilon$-caprolactam, $\omega$-dodecalactam, etc.; polyamide copolymers made of these components; and mixtures of these polyamide resins. Specifically, the polyamide resins may be nylon 6, nylon 66, nylon 610, nylon 9, nylon 6/66, nylon 66/610, nylon 6/11, etc. Among them, nylon 6 and nylon 66 are particularly preferable from the aspect of good rigidity and heat resistance.

The molecular weights of the polyamide resins are not particularly restricted, but it is preferable to use the polyamide resins with relative viscosities $\eta_r$ (measured in 98% sulfuric acid, JIS K6810) of 1.0 or more. Particularly those having relative viscosities of 2.0 or more are preferable because of their excellent mechanical strength.

In the present invention, the particularly preferred polyamide resins are a combination of nylon 66 and nylon 6, having a nylon 66/nylon 6 weight ratio of 40/60-90/10. When the above weight ratio is lower than 40/60, the compositions show poor antifreeze resistance, and when it exceeds 90/10, the compositions show insufficient impact strength. The preferred weight ratio of nylon 66 to nylon 6 is 50/50-80/20.

Another preferred polyamide resin is nylon 46 in the present invention. Nylon 46 is polyamide obtained from diaminobutane and adipic acid, having repeating units of $(CH_2)_4$ connected via amide bonds. In the present invention, nylon 46 can be used alone as the polyamide resin, but, if necessary, part of nylon 46 may be substituted by nylon 66 and/or nylon 6. When nylon 66 and/or nylon 6 are contained, their total amount is 85 parts by weight or less per 100 parts by weight of the entire polyamide resin. When the total amount of nylon 66 and/or nylon 6 exceeds 85 parts by weight, the resulting compositions show poor heat resistance, mechanical strength and creep resistance. The preferred amount of nylon 66 and/or nylon 6 is 50 parts by weight or less.

Besides them, additional preferable polyamide resins used in the present invention are nylon 12, nylon 612 and nylon 11. They may be used alone or in combination. In this case, the polyamide resin may further contain 85 parts by weight or less of nylon 66 and/or nylon 6 per 100 parts by weight of the polyamide resin. When nylon 66 and/or nylon 6 exceeds 85 parts by weight, the resulting compositions show poor antifreeze resistance, chemical resistance, and water absorption resistance. The preferred amount of nylon 66 and/or nylon 6 contained in the polyamide resins (at least one of nylon 12, nylon 612 and nylon 11) is 50 parts by weight or less.

The polyolefins which may be used in the present invention include homopolymers of α-olefins such as ethylene, propylene, butene-1, pentene-1, hexene-1, 4-methylpentene-1, etc.; copolymers of ethylene and propylene or other α-olefins; and copolymers of these α-olefins. Among them, various types of polyethylene such as low-density polyethylene, linear low-density polyethylene, medium-density polyethylene and high-density polyethylene, and polypropylene are preferable. When propylene is used, it is not restricted to a homopolymer of propylene, and any random or block copolymers of propylene and other α-olefins, in which the propylene content is 50 mol % or more and preferably 80 mol % or more, may be used. The comonomers copolymerizable with propylene are ethylene and other α-olefins, and ethylene is particularly preferable. Accordingly, the term "polypropylene" used herein means that it is not restricted to a homopolymer of propylene but it includes any types of propylene copolymers.

The modified polyolefins which may be used in the present invention mean polyolefins modified with unsaturated carboxylic acids or their anhydrides. The unsaturated carboxylic acids or their anhydrides include monocarboxylic acids such as acrylic acid, methacrylic acid, etc.; dicarboxylic acids such as maleic acid, endomethylenetetrahydrophthalic acid, fumaric acid, itaconic acid, etc.; dicarboxylic anhydrides such as maleic anhydride, endomethylenetetrahydrophthalic anhydride, itaconic anhydride, etc., and particularly dicarboxylic acids or their anhydrides are preferable.

The polyolefins to be modified with unsaturated carboxylic acids or their derivatives are, like the above-described polyolefins, not limited to homopolymers of α-olefins but include copolymers of different α-olefins.

The content of unsaturated carboxyl acids or their anhydrides in the modified polyolefins is preferably determined such that a molar ratio of amino groups/carboxylic groups is within the range of 10–1000. Specifically, it is preferably 0.01–15 weight %. When the content of the unsaturated carboxylic acids or their anhydrides grafted is less than 0.01 weight %, the addition of the modified polyolefins does not provide sufficient effect of improving the compatibility of the polyamide resins with polyolefins. On the other hand, when it exceeds 15 weight %, the modified polyolefins show poor compatibility with polyolefins.

The modified polyolefins may be produced by a solution method or a melt-blending method. In the case of a melt-blending method, polyolefins, unsaturated carboxylic acids or their anhydrides for modifying the polyolefins and catalysts are charged into an extruder, a double-screw blender, etc. and blended in a molten state at a temperature of 150°–250° C. Alternatively, in the case of a solution method, the above starting materials are dissolved in organic solvents such as xylene, and a reaction is conducted while stirring at a temperature of 80°–140° C. In any case, the catalysts may be usual radical polymerization catalysts. Specific examples of the catalysts include peroxides such as benzoyl peroxide, lauroyl peroxide, di-tert-butyl peroxide, acetyl peroxide, tert-butyl perbenzoate, dicumyl peroxide, perbenzoic acid, peracetic acid, tert-butyl perpivalate; azo compounds such as azobisisobutyronitrile, etc. The amount of catalysts added is 1–100 parts by weight or so per 100 parts by weight of the unsaturated carboxylic acids or their anhydrides.

In the fiber-reinforced polymer compositions of the present invention, the polyamide resin is 30–90 weight %, and the polyolefin + the modified polyolefin is 10–70 weight %, based on the resin components. When the polyamide resin is less than 30 weight %, the resulting compositions do not show sufficient heat resistance and mechanical strength, and when it exceeds 90 weight %, the resulting compositions do not show sufficient moldability and antifreeze resistance, and their production costs become high. The preferred amount of the polyamide resin is 55–70 weight %, and the preferred amount of the polyolefin + the modified polyolefin is 30–50 weight %.

The amount of the modified polyolefin, particularly the content of the carboxyl groups in the modified polyolefin, preferably has a close relation with the content of end amino groups in the polyamide resin. It is presumed that in the process of melt-blending, the carboxyl groups in the modified polyolefins are reacted with the end amino groups of the polyamide resins to form modified polyolefin-polyamide resin graft copolymers which serve as compatibilizing agents for the polyolefins and the polyamide resins, and that the amount of the graft copolymers formed is closely related to a molar ratio of end amino groups of the polyamide resins/carboxyl groups. Accordingly, it is preferable to adjust the amount of the modified polyolefins in the compositions such that the molar ratio of end amino groups to the carboxyl groups of the modified polyolefins is within the range of 10–1000. When the amino group/carboxyl group molar ratio is less than 10, too much compatibility is obtained, thereby reducing the heat resistance of the resulting compositions because the properties of the polyamide resins and the polyolefins are averaged. On the other hand, when the amino group/carboxyl group molar ratio exceeds 1000, sufficient compatibilizing effect cannot be obtained by the addition of the modified polyolefins, resulting in the compositions with poor mechanical strength. More preferred molar ratio is 20–200. Incidentally, to meet the above requirements of the molar ratio, the amount of the modified polyolefins is generally 0.1–20 weight %, and preferably 0.5–10 weight %.

The amount of the glass fibers is 5–50 parts by weight per 100 parts by weight of the entire composition. When the glass fibers are less than 5 parts by weight, the resulting composition do not have sufficient heat resistance and mechanical strength. On the other hand, when they exceed 50 parts by weight, the resulting compositions show poor moldability and reduced mechanical strength. The preferred amount of glass fibers is 15–40 parts by weight. Incidentally, the glass fibers are preferably in the form of chopped strands, robing, etc. with fiber diameter of 5–15 μm.

In the present invention, the glass fibers are preferably surface-treated with (1) silane coupling agents and (2) tying agents composed of polymers having carboxyl groups or their anhydride groups. By this surface treatment, the adhesion of the glass fibers to the matrix resins, particularly polyamide resins, is improved, thereby providing the resulting compositions with drastically improved heat resistance, antifreeze resistance and mechanical properties.

The silane coupling agents which may be used in the present invention include amino silane, epoxy silane, methyltrimethoxy silane, methyltriethoxy silane, γ-glycidoxypropyltrimethoxy silane, vinyl triacetoxy silane, hexamethyl silane, vinyl trimethoxy silane, etc.

The polymers having carboxyl groups or their anhydride groups which may be used as tying agents include polymers of monocarboxylic acids such as acrylic acid, methacrylic acid, etc., dicarboxylic acids such maleic acid, endomethylenetetrahydrophthalic acid, fumaric acid, itaconic acid, or dicarboxylic acid anhydrides such as maleic anhydride, endomethylenetetrahydrophthalic anhydride, itaconic anhydride, etc.; and copolymers of these carboxylic acids and vinyl compounds such as stylene, ethylene, etc. Among them, copolymers of monocarboxylic acids or dicarboxylic acids are particularly preferable.

The silane coupling agents and the tying agents may be applied to the glass fibers by immersing the glass fibers in aqueous solutions or emulsions of the silane coupling agents and the tying agents, or by spraying the above aqueous solutions or emulsions to the glass fibers. In this case, silane coupling agents and the tying agents may be applied simultaneously as a single aqueous solution or aqueous emulsion, or they may be applied separately by separate aqueous solutions or emulsions. In the case of separate application, the silane coupling agents are preferably applied first.

After applying the silane coupling agents and the tying agents by the above method, the glass fibers are preferably heated at 100°-200° C. for 1-30 minutes to accelerate the drying of the glass fibers and the hardening reaction of the silane coupling agents.

The amount of the silane coupling agents applied is preferably 0.1-1 weight % based on the glass fibers. When the amount of the silane coupling agents is less than 0.1 weight %, the glass fibers cannot be completely covered by the silane coupling agents. On the other hand, when it exceeds 1 weight %, too thick a silane coupling agent layer is formed on the glass fibers. The particularly preferred amount of the silane coupling agents applied is 0.3-0.5 weight %.

The amount of the tying agents is preferably 5-20 times that of the silane coupling agents. That is, it is preferably 1.5-10% based on the weight of the glass fibers. When the amount of the tying agents is less than 1.5 weight %, the glass fibers are not well tied, and they are not strongly adhered to the matrix resins. On the other hand, when the tying agents exceed 10 weight %, the glass fibers are not well dispersed in the process of extrusion blending.

The fiber-reinforced polymer compositions of the present invention may further contain inorganic fillers in the form of a sphere, flake or fiber, such as talc, mica, potassium titanate, etc. in an amount of 1-10 parts by weight, per 100 parts by weight of the entire composition, to improve the mechanical properties such as tensile strength, flexural modulus and impact strength. The above inorganic fillers may be a combination of two or more spherical, flaky or finely fibrous compounds such as talc, mica, potassium titanate, etc. In this case, the total amount of two or more compounds is 1-10 parts by weight. When the amount of the inorganic fillers is less than 1 part by weight, the sufficient improvement in tensile strength, flexural modulus, etc. cannot be obtained, and when it exceeds 10 parts by weight, the impact strength of the compositions decreases. The preferred amount of the inorganic fillers is 2-8 parts by weight.

The fiber-reinforced polymer compositions of the present invention may further contain at least one nucleating agent selected from the group consisting of (a), (b) and (c) in an amount of 0.03-3 parts by weight per 100 parts by weight of the entire compositions:

(a) a metal salt of aromatic carboxylic acid, (b) a metal salt of alkyl group-substituted derivative of aromatic carboxylic acid, and (c) dibenzylidene sorbitol.

When the amount of the above nucleating agents is less than 0.03 parts by weight, the above effects cannot be obtained. On the other hand, when the amount of the nucleating agents exceeds 3 parts by weight, further improvement of the above properties cannot be obtained, simply increasing the production costs of the compositions. The preferred amount of the nucleating agents is 0.05-1 parts by weight.

Specific examples of the compounds (a) and (b) include sodium benzoate, aluminum p-tert-butylbenzoate, titanium p-tert-butylbenzoate, chromium p-tert-butylbenzoate, aluminum monophenyl acetate, aluminum p-tert-butylmonohydroxybenzoate, etc.

The fiber-reinforced polymer compositions of the present invention has a morphology in which the polyamide resin forms a continuous matrix phase, while the polyolefin forms a domain phase having an average size of 0.5-5 μm. When the polyamide resin does not form a continuous matrix phase or when polyolefin domains have an average size of less than 0.5 μm, the resulting compositions show extremely low thermal deformation resistance. On the other hand, when the polyolefin domains have an average size exceeding 5 μm, the resulting compositions show drastically insufficient tensile strength, flexural modulus, impact strength, etc.

The fiber-reinforced polymer compositions of the present invention may further contain other additives such as thermostabilizers, anti-oxidants, photostabilizers, flame retarders, plasticizers, anti-static agents, parting agents, foaming agents, etc. to improve their properties.

The compositions of the present invention may be produced by blending in a molten state by using a single-screw extruder, a double-screw extruder, etc.

In the production of the fiber-reinforced polymer compositions of the present invention, the double-screw extruder satisfying the following requirements is preferably used:

(a) Having a first hopper, a second hopper, a vent and a die exit in this order;

(b) Having at least one first kneading zone located upstream of the second hopper for strongly blending the resin components; and (c) Having at least one second kneading zone located between the second hopper and the vent for strongly blending the resin components and the glass fibers.

With respect to the requirement (a), the first hopper is for charging the polyamide resin, the polyolefin and the modified polyolefin into the double-screw extruder, the second hopper is for charging the glass fibers, the vent is for removing low-molecular components generated during the blending of the resin components and the glass fibers, and the die exit is for extruding the blended compositions in the form of strand.

With respect to the requirement (b), the first kneading zone is for strongly kneading the resin components, and, if necessary, a plurality of the first kneading zones are provided. Each first kneading zone is constituted by 4 or more, particularly 4–16 kneading discs arranged continuously. Each pair of the kneading discs are fixed to two screw shafts, so that they are rotated by the rotation of the screws. Since each kneading disc is in a cam shape, a gap between each pair of the kneading discs is changed by the rotation of the screws. Thus, the resin components passing therethrough are strongly blended.

With respect to the requirement (c), the second kneading zone is for strongly blending the resin components and the glass fibers, and its structure itself is essentially the same as the first kneading zone.

The double-screw extruder having the above structural features has a structure as illustrated in FIG. 1. This double-screw extruder preferably has the following structure:

(a) A length/diameter (L/D) ratio of the double-screw extruder is 25 or more;
(b) It has:
  (1) A first hopper 1 for charging the resin components;
  (2) Die 2 for extruding the fiber-reinforced polymer compositions;
  (3) A second hopper 3 positioned in L/D 15–20 downstream of the first hopper for introducing the glass fibers;
  (4) A vent 4 provided between the second hopper 3 and the die 2;
  (5) At least two first kneading zones 5, 5', ... provided between the first hopper 1 and the second hopper 3; and
  (6) At least one second kneading zone 6 provided between the second hopper 3 and the vent 4;
(c) The resin temperature in L/D 3.5–7.5 upstream of the second hopper 3 is 290°–320° C.;
(d) The resin temperature in other zones is 260°–290° C.; and
(e) The resin temperature at the die exit is 260°–290° C.

When the L/D ratio of the double-screw extruder is less than 25, sufficient blending cannot be achieved. The preferred L/D ratio is 25–35.

The first hopper (the main hopper) 1, the second hopper 3, the vent 4 and the die 2 may have known structures.

The distance between the second hopper 3 and the die 2 is L/D 5–20. When it is less than L/D 5, sufficient blending cannot be achieved between the resin components and the glass fibers. On the other hand, when it exceeds L/D 20, the deterioration of the resin components and the breakage of the glass fibers are likely to take place. In this connection, the distance between the first hopper 1 and the second hopper 3 is preferably L/D 15–20.

The distance between the second hopper 3 and the vent 4 is preferably L/D 2.5–10. When it is less than L/D 2.5, sufficient venting effects cannot be obtained because the tying agents of the glass fibers are still in an unmolten state. On the other hand, when it exceeds 10, venting up may take place.

Figure 2:
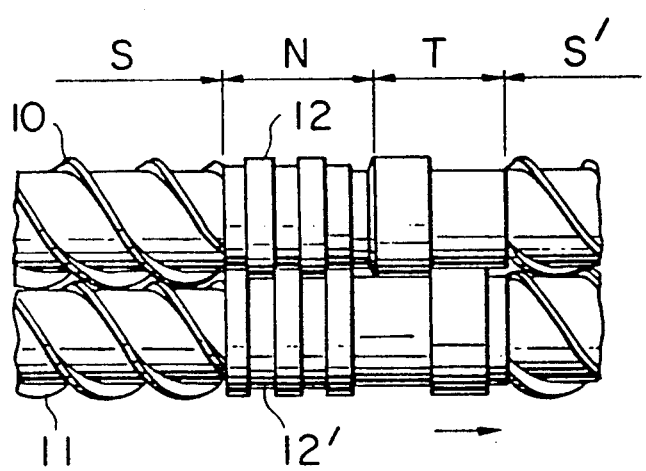
FIG. 2 is a partial enlarged view showing a kneading zone of the double-screw extruder used in the method of the present invention.

Both of the first kneading zones 5, 5' and the second kneading zone 6 are preferably L/D 1–4 and constituted by 4 or more kneading discs each having L/D of $\frac{1}{4}$ or $\frac{1}{8}$. Incidentally, each kneading zone has preferably the structure as illustrated in FIG. 2.

Figure 3:
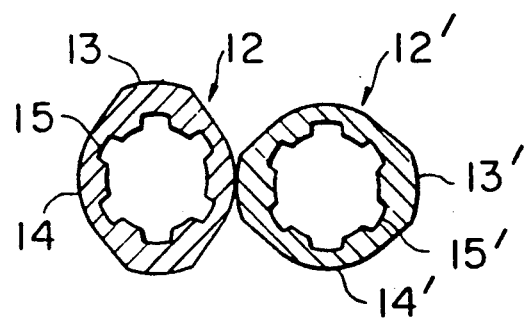
FIG. 3 is a cross-sectional view showing one example of a pair of kneading discs.

Specifically speaking, a plurality of the kneading discs 12, 12' ... arranged on the intermediate portions of the two screws 10, 11 form a kneading zone N, which is sandwiched by screw zones S, S'. In the kneading zone N, kneading discs 12, 12' ... are arranged in pair, each fixed to each screw shaft. FIG. 3 shows a cross section of a pair of kneading discs 12, 12'. Each kneading disc 12, 12' has a peripheral surface in the form of a cam, each having projecting portions 13, 13' and circular portions 14, 14'. In each pair, the kneading discs 12, 12' are fixed to the screw shafts (not shown) by spline grooves 15, 15', such that each of the projecting portions 13, 13' and each of the circular portions 14, 14' are opposing to each other. Accordingly, in each pair, a gap between the kneading discs 12, 12' drastically changes by the rotation of the screw shafts. As shown in FIG. 2, since a plurality of the kneading discs 12, 12' ... are arranged continuously, the resin components passing through each pair of the kneading discs (or mixtures of the resin components and the glass fibers) are subjected to much stronger blending action than by the screws. Incidentally, in FIG. 2, a transition zone (seal ring) T is provided downstream of the kneading discs 12, 12' in the kneading zone N, so that the blended product does not easily go out of the kneading zone.

In the above-described structure, it is necessary that there are at least one, preferably two or more, first kneading zone and at least one second kneading zone.

Without the first kneading zone 5, 5' ..., or if it does not have sufficient length, the resin components would not be well blended, so that they are not sufficiently plasticized.

When the second kneading zone 6 has a length smaller than L/D 1 due to the insufficiency of kneading discs, the resins are too cooled by the addition of the glass fibers, so that the mixing of the glass fibers with the resins is hindered, and that surging tends to take place.

In general, a front end of the first kneading zone 5, 5' is located at L/D 5–20 downstream of the first hopper 1, and the total length of the first kneading zone is L/D 2–8 or so. A front end of the second kneading zone 6 is located at L/D 2–6 downstream of the second hopper 3, and the total length of the second kneading zone is L/D 1–4 or so.

When the resin temperature in a zone of L/D 3.5–7.5 upstream of the second hopper 3 does not reach the range of 290°–320° C., the glass fibers are prevented from being mixed with the resin components, and surging may take place. However, when the resin temperature is too high, the resins may be deteriorated, failing to provide the desired properties. In the other zones, the resin temperature is 260°–290° C. Incidentally, the resin temperature at the die exit is preferably 260°–290° C.

In the above double-screw extruder, the resin components are introduced into the double-screw extruder through the first hopper (the main hopper) 1, and the glass fibers are introduced into the double-screw extruder through the second hopper 3, and the two screws are rotated at 100–300 rpm to blend the resin components and the glass fibers. The compositions obtained by blending are extruded through the die exit 2 in the form of strand, and they are cut into pellets.

The fiber-reinforced polymer compositions of the present invention produced by the above double-screw extruder may easily be formed into desired shapes by a usual injection-molding method.

As described in detail above, although the polyamide resins and the polyolefins themselves do not have good compatibility, their compatibility is improved by the addition of the unsaturated carboxylic acid-modified polyolefins. The reason therefor seems to be that a reaction between the end amino groups of the polyamide resins and the carboxyl groups of the modified polyolefins takes place to form polyamide-modified polyolefin graft copolymers. Accordingly, a good compatibilizing effect can be obtained by adjusting the amount of the graft copolymers produced by selecting a molar ratio of the end amino groups to the carboxyl groups in the desired range of 10–1000. In this case, the fiber-reinforced polymer compositions have a morphology in which the polyamide resins form continuous phases, and the polyolefins form fine domains having an average size of 0.5–5 μm. The polyolefin domains are effective to provide proper compatibility to the polyamide resins and the polyolefins. Incidentally, when the polyolefin domain size is less than 0.5 μm, sufficient compatibility cannot be obtained. On the other hand, when it exceeds 5 μm, the fiber-reinforced polymer compositions show poor mechanical properties because cracks tend to appear on the domain surfaces by external stress.

When the glass fibers are surface-treated with the silane coupling agents and the tying agents made of polymers containing carboxyl groups or their anhydride groups, the adhesion of the glass fibers to the matrix resins is remarkably improved. This seems to be due to the fact that the carboxyl groups or their anhydride groups in the tying agents are reacted with the end amino groups of the polyamide resins.

The addition of the inorganic fillers serves to drastically improve the mechanical properties of the compositions, because the inorganic fillers act as rigid filling materials in the compositions, thereby improving the modulus of the entire compositions, and because they serve as nucleating agents for the polyamide resins, thereby increasing the crystallinity of the polyamide resins.

When the nucleating agents are added, the fiber-reinforced polymer compositions show drastically improved impact resistance and modulus. This seems to be due to fact that by the addition of the nucleating agents, spherulites of the polyamide resins and the polyolefins are made finer, thereby increasing the affinity between the crystal particles themselves and between the resin components and the glass fibers, and also increasing the crystallinity of the resins.

When nylon 66 and nylon 6 are used as polyamide resins in a particular proportion, the resulting fiber-reinforced polymer compositions have drastically improved impact resistance. This seems to be due to the fact that since nylon 66 and nylon 6 are partially dissolved in each other to prevent crystallization, the compatibility of nylon 66 and nylon 6 with the polyolefins is improved, thereby increasing the ductility of the compositions.

When the polyamide resins consist of nylon 46, and may contain nylon 66 and/or nylon 6, if necessary the resulting compositions show extremely improved heat resistance, mechanical properties, and creep resistance. This seems to be due to the fact that nylon 46 having high crystallinity, high thermal deformation temperature and excellent creep resistance is added to the polymer compositions.

Further, when the polyamide resins consist of nylon 12, nylon 612 or nylon 11, and if necessary, nylon 66 and/or nylon 6, the compositions show improved moldability, chemical resistance, antifreeze resistance and water absorption resistance. This seems to be due to the fact that nylon 12, nylon 612 and nylon 11 have relatively long methylene chains, showing polyolefinic properties.

According to the present invention, strong and stable blending between the resin components and the glass fibers can be achieved by using the double-screw extruder having the first kneading zone and the second kneading zone, thereby achieving the uniform dispersion of the polyamide resins and the polyolefins which do not have good compatibility. Thus, the resulting compositions show excellent mechanical strength and heat resistance.

The present invention will be described in further detail by the following Examples.

In each Example and Comparative Example, the properties of the fiber-reinforced polymer compositions were measured as follows:

(1) MFR

Measured at 275° C. under a load of 2160 g according to JIS K7210.

(2) Thermal Deformation Temperature

A test piece (cantilever) of 110 mm × 4 mm × 12.7 mm was bent under a constant load of 18.6 kg at a constant temperature elevating rate of 2° C./minute, and a temperature at which the test piece was bent by a predetermined amount (0.25 mm) was measured according to JIS K7207.

(3) Tensile Strength

Measured at 23° C. and 140° C. respectively, according to JIS K7113.

(4) Flexural Modulus

Measured at 23° C. and 140° C. respectively, according to JIS K7203.

(5) Izod Impact Strength

Measured at 23° C. and −40° C. respectively, according to JIS K7110.

(6) Antifreeze Resistance

A test piece was immersed in a 50% aqueous solution of a commercially available long life automobile coolant at 140° C. for 200 hours, and the tensile strength of the test piece in a water-absorbed state was measured. The antifreeze resistance is expressed by a tensile strength retention ratio (%), assuming that the original tensile strength is 100.

(7) Geer Oven Life

After heating a test piece in a Geer oven at 150° C. for 3000 hours, a tensile strength retention ratio was measured.

Incidentally, in the tests (3)–(5), they were measured both under dry conditions and under water-absorbed conditions. The dry conditions mean that an injection-molded test piece was placed in a desiccator and kept at 23° C. for 75 hours, and the water-absorbed conditions mean that the injection-molded test piece was immersed in water at 100° C. for 24 hours.

EXAMPLES 1-5

Nylon, polypropylene and modified polypropylene were dry-blended in a high-speed mixer in proportions shown in Table 1, and introduced into a double-screw extruder of 45 mm in inner diameter through its main hopper. Further, chopped strands of glass fibers having an average diameter of 13 μm and an average length of 3 mm were introduced into the double-screw extruder at its intermediate position in proportions shown in Table 1 to produce composition pellets.

The composition pellets were dried in a drying furnace, and then formed into test pieces by injection molding to measure the properties shown in Table 1. The results are shown in Table 1.

TABLE 1

| Example No. | 1 | 2 | 3 | 4 | 5 |
|---|---|---|---|---|---|
| COMPOSITION (wt. %)[1] | | | | | |
| Nylon 66[2] | 60 | 60 | 60 | 60 | 60 |
| Polypropylene[3] | 38.8 | 28 | 35 | 35 | 39 |
| Modified Polypropylene[4] | | | | | |
| Grafted Acid Content | 0.2 | 0.25 | 0.2 | 0.2 | 1.0 |
| Content | 1.2 | 12 | 5 | 5 | 1 |
| Glass Fiber[5] | 35 | 35 | 35 | 40 | 35 |
| Molar Ratio of Amino Group/Carboxyl Group | 83 | 10 | 20 | 20 | 20 |
| Average Size of Polypropylene Domain (μm) | 4 | 0.7 | 2 | 2 | 2 |
| PROPERTIES | | | | | |
| MFR (g/10 minutes) | 20 | 8.5 | 14 | 14 | 14 |
| Thermal Deformation Temp. (°C.) | 240 | 230 | 240 | 240 | 240 |
| Under Dry Conditions | | | | | |
| Tensile Strength (kg/cm²) | | | | | |
| (23° C.) | 2300 | 2200 | 2300 | 2600 | 2300 |
| (140° C.) | 1100 | 1000 | 1100 | 1400 | 1100 |
| Flexural Modulus (kg/cm²) | | | | | |
| (23° C.) | 80000 | 77000 | 82000 | 89000 | 82000 |
| (140° C.) | 30000 | 29000 | 30000 | 35000 | 30000 |
| Izod Impact Strength (kg.cm/cm) | | | | | |
| (23° C.) | 16 | 15 | 16 | 17 | 16 |
| (−40° C.) | 12 | 12 | 12 | 13 | 12 |
| Under Water-Absorbed Conditions | | | | | |
| Tensile Strength (kg/cm²) (23° C.) | 1500 | 1500 | 1500 | 1800 | 1500 |
| Flexural Modulus (kg/cm²) (23° C.) | 60000 | 58000 | 61000 | 70000 | 61000 |
| Izod Impact Strength (kg.cm/cm) (23° C.) | 18 | 17 | 18 | 18 | 18 |
| Antifreeze Resistance % | 85 | 85 | 85 | 85 | 85 |
| Geer Oven Life (%) | 90 | 90 | 90 | 90 | 90 |

Note
[1] The contents of nylon, polypropylene and modified polypropylene are expressed by weight % based upon resin components, and the content of glass fibers is expressed by weight % based upon the total composition.
[2] Amiran CM 3001N manufactured by Toray Industries, Inc. and containing end amino groups in an amount of 0.034 milliequivalent/g measured according to a Korshak-Zamyationa method (back titration method) (Chem. Abs. 40, 4665, '46, ibid 42, 6152, '48).
[3] J-215 manufactured by Tonen Sekiyu Kagaku K.K.
[4] Maleic anhydride-modified polypropylene.
[5] MA03FT-2 manufactured by Asahi Fiber Glass K.K.

COMPARATIVE EXAMPLES 1-3

Fiber-reinforced polymer compositions were produced in proportions shown in Table 2 under the same conditions as in the above Examples except for changing the amino group/carboxyl group molar ratios outside the range of 10-1000, and the same measurements were conducted. The results are shown in Table 2.

TABLE 2

| Comparative Example No. | 1 | 2 | 3 |
|---|---|---|---|
| COMPOSITION (wt. %)[1] | | | |
| Nylon 66[2] | 60 | 60 | 60 |
| Polypropylene[3] | 39.95 | 25 | 35 |
| Modified Polypropylene[4] | | | |
| Grafted Acid Content | 0.2 | 0.2 | 1.0 |
| Content | 0.05 | 15 | 5 |
| Glass Fiber[5] | 35 | 35 | 35 |
| Molar Ratio of Amino Group/Carboxyl Group | 2000 | 6.4 | 4 |
| Average Size of Polypropylene Domain (μm) | 10 | 0.2 | <0.1 |
| PROPERTIES | | | |
| MFR (g/10 minutes) | 35 | 5 | 3 |
| Thermal Deformation Temp. (°C.) | 200 | 160 | 160 |
| Under Dry Conditions | | | |
| Tensile Strength (kg/cm²) | | | |
| (23° C.) | 1500 | 1800 | 1800 |
| (140° C.) | 750 | 500 | 500 |
| Flexural Modulus (kg/cm²) | | | |
| (23° C.) | 50000 | 82000 | 80000 |
| (140° C.) | 13000 | 23000 | 20000 |
| Izod Impact Strength (kg.cm/cm) | | | |
| (23° C.) | 9 | 9 | 9 |
| (−40° C.) | 8 | 8 | 8 |
| Under Water-Absorbed Conditions | | | |
| Tensile Strength (kg/cm²) (23° C.) | 1000 | 1200 | 1200 |
| Flexural Modulus (kg/cm²) (23° C.) | 35000 | 60000 | 59000 |

TABLE 2-continued

| Comparative Example No. | 1 | 2 | 3 |
|---|---|---|---|
| Izod Impact Strength (kg.cm/cm) (23° C.) | 11 | 11 | 11 |
| Antifreeze Resistance % | 80 | 80 | 80 |
| Geer Oven Life (%) | 90 | 90 | 90 |

Note: [1]-[5] Same as in Table 1.

As is clear from the above results, the fiber-reinforced polymer compositions of the present invention, which not only contain the unsaturated carboxylic acid-modified polypropylene serving to increase the compatibility of the polyamide resin and the polypropylene, but also have molar ratios of amino groups/carboxyl groups set in the predetermined range as well as an average size of polypropylene domains within the range of 0.5-5 μm, show excellent mechanical strength, heat resistance, moldability, antifreeze resistance, etc.

EXAMPLES 6-8

Nylon 66, polypropylene and modified polypropylene were dry-blended in a high-speed mixer in proportions shown in Table 3, and introduced into a double-screw extruder shown in FIG. 1 through its main hopper.

The double-screw extruder used had the following structure:

| | |
|---|---|
| Outer diameter of screw | 45 mm |
| L/D ratio | 28 |
| Position of second hopper | At L/D 14 downstream of first hopper. |
| Position of vent | At L/D 5.5 upstream of die |
| First kneading zone | |
| Number | 2 |
| Position | At L/D 2 and L/D 4 upstream of second hopper |
| Size of each kneading disc | L/D = ¼ |
| Number of kneading discs | 6 |
| Second kneading zone | |
| Number | 1 |
| Position | At L/D 7 upstream of die |
| Size of each kneading disc | L/D = ¼ |
| Number of kneading discs | 4 |

The chopped strands of the glass fibers (average diameter: 13 μm, average length: 3 mm) were introduced in proportions shown in Table 3 into the double-screw extruder through its second hopper. The temperatures in various portions of the double-screw extruder were as follows:

| | |
|---|---|
| Zone between L/D 3.5 and 7.5 upstream of the second hopper | 290° C. |
| Other zones | 270° C. |

With this double-screw extruder having screws rotating at 200 rpm, composition pellets were produced. The resulting composition pellets were dried in a drying furnace and then injection-molded to provide test pieces to measure their properties. The results are shown in Table 3.

TABLE 3

| Example No. | 6 | 7 | 8 |
|---|---|---|---|
| COMPOSITION (wt. %)[1] | | | |
| Nylon 66[2] | 60 | 60 | 60 |
| Polypropylene[3] | 35 | 38.8 | 28 |
| Modified Polypropylene[4] | | | |
| Grafted Acid Content | 0.2 | 0.2 | 0.25 |
| Content | 5 | 1.1 | 12 |
| Glass Fiber[5] | 35 | 35 | 35 |
| Molar Ratio of Amino Group/Carboxyl Group | 20 | 83 | 10 |
| Average Size of Polypropylene Domain (μm) | 2 | 4 | 0.7 |
| PROPERTIES | | | |
| MFR (g/10 minutes) | 14 | 20 | 8.5 |
| Thermal Deformation Temp. (°C.) | 240 | 240 | 230 |
| Under Dry Conditions | | | |
| Tensile Strength (kg/cm$^2$) | | | |
| (23° C.) | 2300 | 2300 | 2200 |
| (140° C.) | 1100 | 1100 | 1000 |
| Flexural Modulus (kg/cm$^2$) | | | |
| (23° C.) | 82000 | 80000 | 79000 |
| (140° C.) | 30000 | 30000 | 29000 |
| Izod Impact Strength (kg.cm/cm) | | | |
| (23° C.) | 16 | 16 | 15 |
| (−40° C.) | 12 | 12 | 12 |
| Under Water-Absorbed Conditions | | | |
| Tensile Strength (kg/cm$^2$) | | | |
| (23° C.) | 1500 | 1500 | 1500 |
| Flexural Modulus (kg/cm$^2$) | | | |
| (23° C.) | 61000 | 60000 | 58000 |
| Izod Impact Strength (kg.cm/cm) | | | |
| (23° C.) | 18 | 18 | 17 |
| Antifreeze Resistance % | 85 | 85 | 85 |
| Geer Oven Life (%) | 90 | 90 | 90 |

Note:
[1] The contents of nylon, polypropylene and modified polypropylene are expressed by weight % based upon resin components, and the content of glass fibers is expressed by weight % based upon the total composition.
[2] Amiran CM 3001N manufactured by Toray Industries, Inc. and containing end amino groups in an amount of 0.034 milliequivalent/g measured according to a Korshak-Zamyationa method (back titration method) (Chem. Abs. 40, 4665, '46, ibid 42, 6152, '48).
[3] J-215 manufactured by Tonen Sekiyu Kagaku K.K.
[4] Maleic anhydride-modified homopolypropylene.
[5] MA03FT-2 manufactured by Asahi Fiber Glass K.K.

EXAMPLES 9-11

Fiber-reinforced polymer compositions were produced in proportions shown in Table 4 under the same conditions as in Examples 6-8 except for changing polypropylene to polyethylene (J-6311, manufactured by Tonen Sekiyu Kagaku K.K.), and the same tests were conducted. The results are shown in Table 4.

TABLE 4

| Example No. | 9 | 10 | 11 |
|---|---|---|---|
| COMPOSITION (wt. %)[1] | | | |
| Nylon 66[2] | 60 | 60 | 60 |
| Polypropylene[3] | 35 | 38.8 | 28 |
| Modified Polypropylene[4] | | | |
| Grafted Acid Content | 0.2 | 0.2 | 0.25 |
| Content | 5 | 1.2 | 12 |
| Glass Fiber[5] | 35 | 35 | 35 |
| Molar Ratio of Amino Group/Carboxyl Group | 20 | 83 | 10 |
| Average Size of Polypropylene Domain (μm) | 3 | 4.5 | 1 |
| PROPERTIES | | | |
| MFR (g/10 minutes) | 16 | 21 | 8.5 |
| Thermal Deformation Temp. (°C.) | 240 | 240 | 230 |
| Under Dry Conditions | | | |
| Tensile Strength (kg/cm$^2$) | | | |
| (23° C.) | 1900 | 1900 | 1900 |

TABLE 4-continued

| Example No. | 9 | 10 | 11 |
|---|---|---|---|
| (140° C.) | 900 | 900 | 900 |
| Flexural Modulus (kg/cm²) | | | |
| (23° C.) | 70000 | 70000 | 70000 |
| (140° C.) | 25000 | 25000 | 25000 |
| Izod Impact Strength (kg.cm/cm) | | | |
| (23° C.) | 20 | 20 | 19 |
| (−40° C.) | 17 | 17 | 16 |
| Under Water-Absorbed Conditions | | | |
| Tensile Strength (kg/cm²) | 1500 | 1500 | 1500 |
| (23° C.) | | | |
| Flexural Modulus (kg/cm²) | 50000 | 50000 | 50000 |
| (23° C.) | | | |
| Izod Impact Strength (kg.cm/cm) | 23 | 23 | 21 |
| (23° C.) | | | |
| Antifreeze Resistance % | 87 | 87 | 87 |
| Geer Oven Life (%) | 92 | 92 | 92 |

Note:
[1] The contents of nylon, polypropylene and modified polypropylene are expressed by weight % based upon resin components, and the content of glass fibers is expressed by weight % based upon the total composition.
[2]−[5] Same as in Table 3.
[3] J-6311 manufactured by Tonen Sekiyu Kagaku K.K.
[4] Maleic anhydride-modified high-density polypropylene.

COMPARATIVE EXAMPLE 4

A fiber-reinforced polymer composition was produced in a proportion shown in Table 5 under the same conditions as in Example 6 except for adding no modified polypropylene, and the same tests were conducted. The results are shown in Table 5.

COMPARATIVE EXAMPLE 5

A fiber-reinforced polymer composition was produced in a proportion shown in Table 5 under the same conditions as in Example 6 except for using modified polypropylene (graft content: 1.0 weight %) in such an amount as to form polypropylene domains having an average size of less than 0.1 μm, and the same tests were conducted. The results are shown in Table 5.

COMPARATIVE EXAMPLE 6

A fiber-reinforced polymer composition was produced by lightly blending the components in a proportion shown in Table 5 by a Brabender Plastograph, and the same tests were conducted. The results are shown in Table 5.

TABLE 5

| Comparative Example No. | 4 | 5 | 6 |
|---|---|---|---|
| COMPOSITION (wt. %)[1] | | | |
| Nylon 66[2] | 60 | 60 | 60 |
| Polypropylene[3] | 40 | 35 | 35 |
| Modified Polypropylene[4] | | | |
| Grafted Acid Content | — | 1.0 | 0.2 |
| Content | 0 | 5 | 5 |
| Glass Fiber[5] | 35 | 35 | 35 |
| Molar Ratio of Amino Group/Carboxyl Group | — | 3.8 | 20 |
| Average Size of Polypropylene Domain (μm) | 15 | <0.1 | 10 |
| PROPERTIES | | | |
| MFR (g/10 minutes) | 35 | 3 | 25 |
| Thermal Deformation Temp. (°C.) | 220 | 160 | 220 |
| Under Dry Conditions | | | |
| Tensile Strength (kg/cm²) | | | |
| (23° C.) | 1800 | 1800 | 1800 |
| (140° C.) | 800 | 500 | 800 |
| Flexural Modulus (kg/cm²) | | | |
| (23° C.) | 55000 | 80000 | 55000 |
| (140° C.) | 15000 | 20000 | 15000 |
| Izod Impact Strength (kg.cm/cm) | | | |
| (23° C.) | 9 | 9 | 9 |
| (−40° C.) | 8 | 8 | 8 |
| Under Water-Absorbed Conditions | | | |
| Tensile Strength (kg/cm²) | 1200 | 1200 | 1200 |
| (23° C.) | | | |
| Flexural Modulus (kg/cm²) | 35000 | 59000 | 35000 |
| (23° C.) | | | |
| Izod Impact Strength (kg.cm/cm) | 10 | 11 | 10 |
| (23° C.) | | | |
| Antifreeze Resistance % | 80 | 80 | 80 |
| Geer Oven Life (%) | 90 | 90 | 90 |

Note: [1]−[5] Same as in Table 3.

COMPARATIVE EXAMPLES 7–9

Fiber-reinforced polymer compositions were produced in proportions shown in Table 6 under the same conditions as in Comparative Examples 4–6 except for changing polypropylene to polyethylene, and the same tests were conducted. The results are shown in Table 6.

TABLE 6

| Comparative Example No. | 7 | 8 | 9 |
|---|---|---|---|
| COMPOSITION (wt. %)[1] | | | |
| Nylon 66[2] | 60 | 60 | 60 |
| Polypropylene[3] | 40 | 35 | 35 |
| Modified Polypropylene[4] | | | |
| Grafted Acid Content | — | 1.0 | 0.2 |
| Content | — | 5 | 5 |
| Glass Fiber[5] | 35 | 35 | 35 |
| Molar Ratio of Amino Group/Carboxyl Group | — | 3.8 | 20 |
| Average Size of Polypropylene Domain (μm) | 18 | <0.1 | 14 |
| PROPERTIES | | | |
| MFR (g/10 minutes) | 38 | 5 | 30 |
| Thermal Deformation Temp. (°C.) | 210 | 140 | 210 |
| Under Dry Conditions | | | |
| Tensile Strength (kg/cm²) | | | |
| (23° C.) | 1500 | 1600 | 1500 |
| (140° C.) | 600 | 400 | 600 |
| Flexural Modulus (kg/cm²) | | | |
| (23° C.) | 45000 | 60000 | 45000 |
| (140° C.) | 10000 | 15000 | 10000 |
| Izod Impact Strength (kg.cm/cm) | | | |
| (23° C.) | 12 | 12 | 12 |
| (−40° C.) | 10 | 10 | 10 |
| Under Water-Absorbed Conditions | | | |
| Tensile Strength (kg/cm²) | 1000 | 1100 | 1000 |
| (23° C.) | | | |
| Flexural Modulus (kg/cm²) | 30000 | 45000 | 30000 |
| (23° C.) | | | |
| Izod Impact Strength (kg.cm/cm) | 13 | 13 | 13 |
| (23° C.) | | | |
| Antifreeze Resistance % | 87 | 87 | 87 |
| Geer Oven Life (%) | 92 | 92 | 92 |

Note:
[1] The contents of nylon, polypropylene and modified polypropylene are expressed by weight % based upon resin components, and the content of glass fibers is expressed by weight % based upon the total composition.
[2]−[5] Same as in Table 4.

As is clear from the results in Tables 3–6, since the fiber-reinforced polymer compositions of the present invention contain polypropylene or polyethylene domains having an average size of 0.5–5 μm and uniformly dispersed in nylon phases, they show excellent mechanical strength, impact resistance and thermal resistance. On the other hand, the fiber-reinforced polymer compositions in the Comparative Examples containing polypropylene or polyethylene domains having an average size outside the above range have poor thermal deformation resistance and mechanical properties.

EXAMPLES 12-16

Nylon, polyethylene and modified polyethylene were dry-blended in a high-speed mixer in proportions shown in Table 7, and introduced into a double-screw extruder of 45 mm in diameter through its main hopper. The chopped strands of the glass fibers (average diameter: 13 μm, average length: 3 mm) were introduced in proportions shown in Table 7 into the double-screw extruder through its second hopper, and they were blended at a temperature of 280° C. to provide composition pellets.

The resulting composition pellets were dried in a drying furnace and then injection-molded to provide test pieces to measure their properties. The results are shown in Table 7.

TABLE 7

| Example No. | 12 | 13 | 14 | 15 | 16 |
|---|---|---|---|---|---|
| COMPOSITION (wt. %)[1] | | | | | |
| Nylon 66[2] | 60 | 60 | 60 | 60 | 60 |
| Polypropylene[3] | 38.8 | 28 | 35 | 35 | 39 |
| Modified Polypropylene[4] | | | | | |
| Grafted Acid Content | 0.2 | 0.25 | 0.2 | 0.2 | 1.0 |
| Content | 1.2 | 12 | 5 | 5 | 1 |
| Glass Fiber[5] | 35 | 35 | 35 | 40 | 35 |
| Molar Ratio of Amino Group/Carboxyl Group | 83 | 10 | 20 | 20 | 20 |
| Average Size of Polypropylene Domain (μm) | 4 | 0.7 | 3 | 3 | 3 |
| PROPERTIES | | | | | |
| MFR (g/10 minutes) | 28 | 15 | 20 | 20 | 20 |
| Thermal Deformation Temp. (°C.) | 240 | 230 | 240 | 240 | 240 |
| Under Dry Conditions | | | | | |
| Tensile Strength (kg/cm²) | | | | | |
| (23° C.) | 1700 | 1600 | 1700 | 1900 | 1700 |
| (140° C.) | 900 | 800 | 900 | 1100 | 900 |
| Flexural Modulus (kg/cm²) | | | | | |
| (23° C.) | 70000 | 69000 | 72000 | 79000 | 72000 |
| (140° C.) | 25000 | 24000 | 25000 | 30000 | 25000 |
| Izod Impact Strength (kg.cm/cm) | | | | | |
| (23° C.) | 19 | 18 | 19 | 19 | 18 |
| (−40° C.) | 18 | 18 | 18 | 19 | 18 |
| Under Water-Absorbed Conditions | | | | | |
| Tensile Strength (kg/cm²) (23° C.) | 1400 | 1400 | 1400 | 1600 | 1400 |
| Flexural Modulus (kg/cm²) (23° C.) | 53000 | 51000 | 54000 | 64000 | 54000 |
| Izod Impact Strength (kg.cm/cm) (23° C.) | 20 | 19 | 20 | 20 | 20 |
| Antifreeze Resistance % | 90 | 90 | 90 | 90 | 90 |
| Geer Oven Life (%) | 95 | 95 | 95 | 95 | 95 |

Note:
[1]The contents of nylon, polypropylene and modified polypropylene are expressed by weight % based upon resin components, and the content of glass fibers is expressed by weight % based upon the total composition.
[2]Amiran CM 3001N manufactured by Toray Industries, Inc. and containing end amino groups in an amount of 0.034 milliequivalent/g measured according to a Korshak-Zamyationa method (back titration method) (Chem. Abs. 40, 4665, '46, ibid 42, 6152, '48).
[3]High-density polyethylene J-6311 manufactured by Tonen Sekiyu Kagaku K.K.
[4]Maleic anhydride-modified polypropylene.
[5]MA03FT-2 manufactured by Asahi Fiber Glass K.K.

COMPARATIVE EXAMPLES 10-12

Fiber-reinforced polymer compositions were produced in proportions shown in Table 8 under the same conditions as in Examples 12-16 except for changing the amino group/carboxyl group molar ratios outside the range of 10-1000, and the same measurements were conducted. The results are shown in Table 8.

TABLE 8

| Comparative Example No. | 10 | 11 | 12 |
|---|---|---|---|
| COMPOSITION (wt. %)[1] | | | |
| Nylon 66[2] | 60 | 60 | 60 |
| Polypropylene[3] | 39.95 | 25 | 35 |
| Modified Polypropylene[4] | | | |
| Grafted Acid Content | 0.2 | 0.2 | 1.0 |
| Content | 0.05 | 15 | 5 |
| Glass Fiber[5] | 35 | 35 | 35 |
| Molar Ratio of Amino Group/Carboxyl Group | 2000 | 6.4 | 4 |
| Average Size of Polypropylene Domain (μm) | 10 | 0.3 | <0.1 |
| PROPERTIES | | | |
| MFR (g/10 minutes) | 40 | 10 | 7 |
| Thermal Deformation Temp. (°C.) | 200 | 150 | 150 |
| Under Dry Conditions | | | |
| Tensile Strength (kg/cm²) | | | |
| (23° C.) | 1200 | 1400 | 1400 |
| (140° C.) | 400 | 350 | 350 |
| Flexural Modulus (kg/cm²) | | | |
| (23° C.) | 40000 | 72000 | 70000 |
| (140° C.) | 8000 | 18000 | 15000 |
| Izod Impact Strength (kg.cm/cm) | | | |
| (23° C.) | 10 | 10 | 10 |
| (−40° C.) | 9 | 9 | 9 |
| Under Water-Absorbed Conditions | | | |
| Tensile Strength (kg/cm²) (23° C.) | 9000 | 1100 | 1100 |

TABLE 8-continued

| Comparative Example No. | 10 | 11 | 12 |
|---|---|---|---|
| Flexural Modulus (kg/cm$^2$) (23° C.) | 27000 | 53000 | 52000 |
| Izod Impact Strength (kg.cm/cm) (23° C.) | 13 | 13 | 13 |
| Antifreeze Resistance % | 85 | 85 | 85 |
| Geer Oven Life (%) | 90 | 90 | 90 |

Note: [(1)-(5)] Same as in Table 7.

As is clear from Tables 7 and 8, the fiber-reinforced polymer compositions of the present invention not only containing the unsaturated carboxylic acid-modified polyethylene serving to increase the compatibility of the polyamide resin and the polyethylene but also having molar ratios of amino groups/carboxyl groups set in the predetermined range are excellent in mechanical strength and heat resistance, and particularly in heat deterioration resistance, moldability, antifreeze resistance, etc.

EXAMPLES 17

Nylon 66, polypropylene and modified polypropylene were dry-blended in a high-speed mixer in proportions shown in Table 9, and introduced into a double-screw extruder shown in FIG. 1 through its main hopper. The chopped strands of the glass fibers (average diameter: 13 μm, average length: 3 mm) were introduced in proportions shown in Table 9 into the double-screw extruder through its second hopper.

The double-screw extruder used had the following structure:

| | |
|---|---|
| Outer diameter of screw | 45 mm |
| L/D ratio | 28 |
| Position of second hopper | At L/D 10 downstream of first hopper. |
| Position of vent | At L/D 5.5 upstream of die |
| First kneading zone | |
| Number | 2 |
| Position | At L/D 2-3.5 and L/D 5-6.5 upstream of second hopper |
| Size of each kneading disc | L/D = 1 |
| Number of kneading discs | 6 |
| Second kneading zone | |
| Number | 1 |
| Position | At L/D 7 upstream of die |
| Size of each kneading disc | L/D = 1 |
| Number of kneading discs | 4 |

The temperatures in various portions of the double-screw extruder were as follows:

| | |
|---|---|
| Zone between L/D 3.5 and 7.5 upstream of the second hopper | 300° C. |
| Other zones (L/D 7.5-25) | 280° C. |

With this double-screw extruder having screws rotating at 200 rpm, composition pellets were produced. The resulting composition pellets were dried in a drying furnace and then injection-molded to provide test pieces to measure their properties. The results are shown in Table 9.

EXAMPLE 18

A fiber-reinforced polymer composition was produced in a proportion shown in Table 9 under the same conditions as in Example 17 except for changing the number of the first kneading zone to 1 and the number of the kneading discs to 8, and the same tests were conducted. The results are shown in Table 9.

COMPARATIVE EXAMPLE 13

A fiber-reinforced polymer composition was produced in a proportion shown in Table 9 under the same conditions as in Example 17 except for changing the number of the first kneading zone to 1 and using 3 kneading discs in the first kneading zone, and the same tests were conducted. The results are shown in Table 9.

COMPARATIVE EXAMPLE 14

A fiber-reinforced polymer composition was produced under the same conditions as in Example 17 except for using a double-screw extruder not having first and second kneading zones. However, since the resin components were insufficiently plasticized, they could not be blended. Thus, the property tests were not conducted.

COMPARATIVE EXAMPLE 15

A fiber-reinforced polymer composition was produced under the same conditions as in Example 17 except for changing the number of the first kneading zone to 1 and adjusting the resin temperature at 260° C. in a zone of L/D 3.5 to L/D 7.5. However, as in Comparative Example 15, the resin components were insufficiently plasticized, so that they could not be blended. Thus, the property tests were not conducted.

TABLE 9

| | Example | | Comparative Example | | |
|---|---|---|---|---|---|
| | 17 | 18 | 13 | 14 | 15 |
| COMPOSITION (wt. %)[(1)] | | | | | |
| Nylon 66[(2)] | 60 | 60 | 60 | 60 | 60 |
| Polypropylene[(3)] | 35 | 35 | 35 | 35 | 35 |
| Modified Polypropylene[(4)] | | | | | |
| Grafted Acid Content | 0.2 | 0.2 | 0.2 | 0.2 | 0.2 |
| Content | 5 | 5 | 5 | 5 | 5 |
| Glass Fiber[(5)] | 35 | 35 | 35 | 35 | 35 |
| Average Size of Polypropylene Domain (μm) | 2 | 3 | 10 | — | — |
| PRODUCTION CONDITIONS | | | | | |
| First Kneading Zone | | | | | |
| Number | 2 | 1 | 1 | 0 | 1 |
| Number of Kneading Discs | 6 | 8 | 3 | — | 6 |
| Second Kneading Zone | | | | | |
| Number | 1 | 1 | 1 | 0 | 1 |
| Number of Kneading Discs | 4 | 4 | 4 | — | 4 |
| Resin Temp. in Extruder (°C.) | | | | | |
| L/D 3.5-7.5 | 300 | 300 | 300 | 300 | 260 |
| L/D 7.5-25 | 280 | 280 | 280 | 280 | 280 |
| PROPERTIES | | | | | |
| MFR (g/10 minutes) | 14 | 16 | 20 | — | — |
| Thermal Deformation Temp. (°C.) | 240 | 240 | 235 | — | — |
| Tensile Strength (kg/cm$^2$) | | | | | |
| (23° C.) | 2300 | 2200 | 1800 | — | — |
| (140° C.) | 1100 | 1100 | 800 | — | — |
| Flexural Modulus | | | | | |

TABLE 9-continued

|  | Example | | Comparative Example | | |
|---|---|---|---|---|---|
|  | 17 | 18 | 13 | 14 | 15 |
| (kg/cm²) |  |  |  |  |  |
| (23° C.) | 82000 | 82000 | 55000 | — | — |
| (140° C.) | 30000 | 30000 | 15000 | — | — |
| Izod Impact Strength |  |  |  |  |  |
| (kg · cm/cm) |  |  |  |  |  |
| (23° C.) | 16 | 15 | 10 | — | — |
| (−40° C.) | 12 | 11 | 8 | — | — |
| Antifreeze Resistance (%) | 85 | 85 | — | — | — |

Note:
[1]The contents of nylon, polypropylene and modified polypropylene are expressed by weight % based upon resin components, and the content of glass fibers is expressed by weight % based upon the total composition.
[2]Amiran CM 3001N manufactured by Toray Industries, Inc. and containing end amino groups in an amount of 0.034 milliequivalent/g measured according to a Korshak-Zamyationa method (back titration method) (Chem. Abs. 40, 4665, '46, ibid 42, 6152, '48).
[3]J-215 manufactured by Tonen Sekiyu Kagaku K.K.
[4]Maleic anhydride-modified homopolypropylene (graft content: 0.2 weight %).
[5]MA03FT-2 manufactured by Asahi Fiber Glass K.K.

As is clear from the results in Table 9, the fiber-reinforced polymer compositions produced by the method of the present invention show excellent mechanical strength, heat resistance and antifreeze resistance, while those produced by the method of Comparative Examples are poor in the above properties. Further, under certain conditions, blending cannot be conducted due to the failure of plasticizing the resin components (Comparative Examples 15 and 16).

EXAMPLES 19–23, COMPARATIVE EXAMPLES 16–18

Nylon, polypropylene and modified polypropylene were dry-blended in a high-speed mixer in proportions shown in Table 11, and introduced into a double-screw extruder of 45 mm in diameter through its main hopper. The chopped strands of the glass fibers (average diameter: 13 μm, average length: 3 mm) were introduced in proportions shown in Table 11 into the double-screw extruder through its second hopper and blended with resin components at a temperature of 280° C. to provide composition pellets. Incidentally, the glass fibers used were surface-treated with treatment agents comprising silane coupling agents and carboxyl group (or anhydride)-containing polymer tying agents in proportions as shown in Table 10. The surface treatment of the glass fibers was conducted by immersing them in aqueous emulsions of the treatment agents and drying them at 120° C. for 5 minutes. The amount of the treatment agent applied in each Example is also shown in Table 10.

The resulting composition pellets were dried in a drying furnace and then injection-molded to provide test pieces to measure their properties. The results are shown in Table 11.

TABLE 10

| Surface Treatment Agent for Glass Fiber | | | |
|---|---|---|---|
| Silane Coupling Agent | Polymer for Tying Agent | Weight Ratio[1] | Amount[2] (Parts by Weight) |
| Example No. |  |  |  |
| 19 | Amino silane | Maleic anhydride-styrene copolymer | 1:10 | 3 |
| 20 | Amino silane | Acrylic acid-styrene copolymer | 1:10 | 3 |
| 21 | Epoxy silane | Maleic anhydride-styrene copolymer | 1:10 | 3 |
| 22 | Amino silane | Maleic anhydride-styrene copolymer | 1:10 | 3 |
| 23 | Amino silane | Maleic anhydride-styrene copolymer | 1:10 | 3 |
| Comparative Example No. |  |  |  |
| 16 | Amino silane | Epoxy resin | 1:10 | 3 |
| 17 | Amino silane | Polyurethane | 1:10 | 3 |
| 18 | — | — | — | — |

Note:
[1]Ratio of silane coupling agent:Polymer tying agent.
[2]Amount per 100 parts by weight of glass fibers.

TABLE 11

|  | Example No. | | | | | Comparative Example No. | | |
|---|---|---|---|---|---|---|---|---|
|  | 19 | 20 | 21 | 22 | 23 | 16 | 17 | 18 |
| COMPOSITION (wt. %)[1] |  |  |  |  |  |  |  |  |
| Nylon 66[2] | 60 | 60 | 60 | 60 | 60 | 60 | 60 | 60 |
| Polypropylene[3] | 35 | 35 | 35 | 38.8 | 28 | 35 | 35 | 35 |
| Modified Polypropylene[4] |  |  |  |  |  |  |  |  |
| Grafted Acid Content | 0.2 | 0.2 | 0.2 | 0.2 | 0.25 | 0.2 | 0.2 | 0.2 |
| Content | 5 | 5 | 5 | 1.2 | 12 | 5 | 5 | 5 |
| Glass Fiber[5] | 35 | 35 | 35 | 35 | 35 | 35 | 35 | 35 |
| Molar Ratio of Amino Group/Carboxyl Group | 20 | 20 | 20 | 80 | 10 | 20 | 20 | 20 |
| Average Size of Polypropylene Domain (μm) | 2 | 2 | 2 | 4 | 0.7 | 2 | 2 | 2 |
| PROPERTIES |  |  |  |  |  |  |  |  |
| MFR (g/10 minutes) | 14 | 14 | 14 | 20 | 8 | 18 | 18 | 18 |
| Thermal Deformation Temp. (°C.) | 240 | 240 | 240 | 240 | 230 | 200 | 200 | 190 |
| Under Dry Conditions |  |  |  |  |  |  |  |  |
| Tensile Strength |  |  |  |  |  |  |  |  |
| (kg/cm²) |  |  |  |  |  |  |  |  |
| (23° C.) | 2300 | 2200 | 2200 | 2300 | 2200 | 2000 | 2000 | 1700 |
| (140° C.) | 1100 | 1000 | 1000 | 1100 | 1000 | 600 | 600 | 450 |
| Flexural Modulus |  |  |  |  |  |  |  |  |
| (kg/cm²) |  |  |  |  |  |  |  |  |
| (23° C.) | 87000 | 82000 | 84000 | 87000 | 82000 | 65000 | 65000 | 55000 |
| (140° C.) | 30000 | 30000 | 30000 | 30000 | 30000 | 12000 | 12000 | 9000 |
| Izod Impact Strength |  |  |  |  |  |  |  |  |

TABLE 11-continued

|  | Example No. | | | | | Comparative Example No. | | |
| --- | --- | --- | --- | --- | --- | --- | --- | --- |
|  | 19 | 20 | 21 | 22 | 23 | 16 | 17 | 18 |
| (kg · cm/cm) | | | | | | | | |
| (23° C.) | 16 | 15 | 15 | 16 | 15 | 12 | 12 | 10 |
| (−40° C.) | 12 | 11 | 11 | 12 | 12 | 8 | 8 | 6 |
| Under Water-Absorbed Conditions | | | | | | | | |
| Tensile Strength (kg/cm$^2$) (23° C.) | 1500 | 1500 | 1500 | 1500 | 1200 | 1200 | 1200 | 1000 |
| Flexural Modulus (kg/cm$^2$) (23° C.) | 61000 | 60000 | 60000 | 61000 | 60000 | 40000 | 41000 | 35000 |
| Izod Impact Strength (kg · cm/cm) (23° C) | 18 | 17 | 17 | 18 | 17 | 15 | 15 | 12 |
| Antifreeze Resistance (%) | 85 | 85 | 85 | 85 | 85 | 50 | 50 | 40 |

Note:
[1]The contents of nylon, polypropylene and modified polypropylene are expressed by weight % based upon resin components, and the content of glass fibers is expressed by weight % based upon the total composition.
[2]Amiran CM 3001N manufactured by Toray Industries, Inc. and containing end amino groups in an amount of 0.034 milliequivalent/g measured according to a Korshak-Zamyationa method (back titration method) (Chem. Abs. 40, 4665, '46, ibid 42, 6152, '48).
[3]J-215 manufactured by Tonen Sekiyu Kagaku K.K.
[4]Maleic anhydride-modified polypropylene.
[5]Glass fibers treated with the treatment agents shown in Table 10.

EXAMPLES 24 AND 25

Fiber-reinforced polymer compositions were produced in proportions shown in Table 12 under the same conditions as in Examples 19 and 20 except for substituting high-density polyethylene (J-6311 manufactured by Tonen Sekiyu Kagaku K.K.) for polypropylene, and also using the above polyethylene modified with carboxylic acids shown in Table 12 as the modified polyethylene, and the same measurements as in Examples 19 and 20 were conducted. The results are shown in Table 12.

TABLE 12

|  | Example No. | |
| --- | --- | --- |
|  | 24 | 25 |
| COMPOSITION (wt. %)[1] | | |
| Nylon 66[2] | 60 | 60 |
| Polyethylene[3] | 35 | 35 |
| Modified Polyethylene[4] | | |
| Grafted Acid Content | 0.2 | 0.2 |
| Content | 5 | 5 |
| Glass Fiber[5] | 35 | 35 |
| Molar Ratio of Amino Group/Carboxyl Group | 20 | 20 |
| Average Size of Polyethylene Domain (μm) | 3 | 3 |
| PROPERTIES | | |
| MFR (g/10 minutes) | 16 | 16 |
| Thermal Deformation Temp. (°C.) | 240 | 240 |
| Under Dry Conditions | | |
| Tensile Strength (kg/cm$^2$) | | |
| (23° C.) | 1900 | 1800 |
| (140° C.) | 900 | 850 |
| Flexural Modulus (kg/cm$^2$) | | |
| (23° C.) | 72000 | 70000 |
| (140° C.) | 25000 | 24000 |
| Izod Impact Strength (kg · cm/cm) | | |
| (23° C.) | 21 | 20 |
| (−40° C.) | 18 | 17 |
| Under Water-Absorbed Conditions | | |
| Tensile Strength (kg/cm$^2$) | | |
| (23° C.) | 1600 | 1600 |
| Flexural Modulus (kg/cm$^2$) (23° C.) | 50000 | 50000 |
| Izod Impact Strength (kg · cm/cm) (23° C) | 24 | 24 |
| Antifreeze Resistance (%) | 88 | 88 |

Note:
[1]The contents of nylon, polyethylene and modified polyethylene are expressed by weight % based upon resin components, and the content of glass fibers is expressed by weight % based upon the total composition.
[2], [5]Same as in Table 11.
[3]High-density polyethylene (J-6311 manufactured by Tonen Sekiyu Kagaku K.K.).
[4]High-density polyethylene (J-6311) modified with maleic anhydride.

As is clear from the above results in Tables 11 and 12, since the fiber-reinforced polymer compositions of the present invention contain not only the unsaturated carboxylic acid-modified polypropylene or polyethylene serving to increase the compatibility of the polyamide resin and the polypropylene or polyethylene, but also the glass fibers treated with the silane coupling agents and the tying agents consisting of polymers having carboxyl groups or their anhydrides, they show excellent mechanical strength, heat resistance, moldability, antifreeze resistance, etc.

EXAMPLES 26-30, COMPARATIVE EXAMPLES 19-21

Nylon, polypropylene, modified polypropylene and inorganic fillers were dry-blended in a high-speed mixer in proportions shown in Table 13, and introduced into a double-screw extruder of 45 mm in inner diameter through its main hopper. The chopped strands of the glass fibers (average diameter: 13 μm, average length: 3 mm) were introduced in proportions shown in Table 13 into the double-screw extruder through its second hopper. They were blended at 280° C. to provide composition pellets.

The resulting composition pellets were dried in a drying furnace and then injection-molded to provide test pieces to measure their properties. The results are shown in Table 13.

TABLE 13

|  | Example No. 26 | 27 | 28 | 29 | 30 | Comparative Example No. 19 | 20 | 21 |
|---|---|---|---|---|---|---|---|---|
| COMPOSITION (wt. %)[1] | | | | | | | | |
| Nylon 66[2] | 60 | 60 | 60 | 60 | 60 | 60 | 60 | 60 |
| Polypropylene[3] | 35 | 35 | 35 | 35 | 35 | 35 | 35 | 35 |
| Modified Polypropylene[4] | | | | | | | | |
| Grafted Acid Content | 0.2 | 0.2 | 0.2 | 0.2 | 0.2 | 0.2 | 0.2 | 1.0 |
| Content | 5 | 5 | 5 | 5 | 5 | 5 | 5 | 5 |
| Glass Fiber[5] | 35 | 35 | 35 | 35 | 35 | 35 | 35 | 35 |
| Molar Ratio of Amino Group/Carboxyl Group | 20 | 20 | 20 | 20 | 20 | 20 | 20 | 20 |
| Average Size of Polypropylene Domain (μm) | 2 | 2 | 2 | 2 | 2 | 2 | 2 | 2 |
| Inorganic Filler | | | | | | | | |
| Talc[6] | 5 | 0 | 0 | 3 | 2 | 15 | 0 | 0 |
| Mica[7] | 0 | 5 | 0 | 0 | 2 | 0 | 15 | 0 |
| Potassium Titanate[8] | 0 | 0 | 5 | 3 | 2 | 0 | 0 | 15 |
| PROPERTIES | | | | | | | | |
| MFR (g/10 minutes) | 10 | 9 | 10 | 10 | 11 | 8 | 7 | 8 |
| Thermal Deformation Temp. (°C.) | 245 | 245 | 240 | 245 | 245 | 240 | 240 | 240 |
| Under Dry Conditions | | | | | | | | |
| Tensile Strength (kg/cm$^2$) | | | | | | | | |
| (23° C.) | 2800 | 2900 | 2800 | 2900 | 2900 | 2700 | 2800 | 2700 |
| (140° C.) | 1500 | 1800 | 1400 | 1700 | 1800 | 1400 | 1500 | 1400 |
| Flexural Modulus (kg/cm$^2$) | | | | | | | | |
| (23° C.) | 90000 | 95000 | 90000 | 94000 | 95000 | 70000 | 90000 | 90000 |
| (140° C.) | 40000 | 43000 | 40000 | 42000 | 44000 | 40000 | 40000 | 40000 |
| Izod Impact Strength (kg · cm/cm) | | | | | | | | |
| (23° C.) | 12 | 12 | 12 | 12 | 12 | 5 | 5 | 5 |
| (−40° C.) | 8 | 8 | 8 | 8 | 8 | 4 | 4 | 4 |
| Under Water-Absorbed Conditions | | | | | | | | |
| Tensile Strength (kg/cm$^2$) (23° C.) | 1700 | 1800 | 1700 | 1800 | 1800 | 1600 | 1700 | 1600 |
| Flexural Modulus (kg/cm$^2$) (23° C.) | 75000 | 78000 | 75000 | 78000 | 78000 | 50000 | 75000 | 75000 |
| Izod Impact Strength (kg · cm/cm) (23° C.) | 14 | 14 | 14 | 14 | 14 | 7 | 7 | 7 |
| Antifreeze Resistance (%) | 85 | 85 | 85 | 85 | 85 | 85 | 85 | 85 |

Note:
[1] The contents of nylon, polypropylene and modified polypropylene are expressed by weight % based upon resin components, and the contents of glass fibers and inorganic fillers are expressed by weight % based upon the total composition.
[2] Amiran CM 3001N · manufactured by Toray Industries, Inc. and containing end amino groups in an amount of 0.034 milliequivalent/g measured according to a Korshak-Zamyations method (back titration method) (Chem. Abs. 40, 4665, '46, ibid 42, 6152, '48).
[3] J-215 manufactured by Tonen Sekiyu Kagaku K.K.
[4] Maleic anhydride-modified polypropylene.
[5] MA03FT-2 manufactured by Asahi Fiber Glass K.K.
[6] 5000 PJ, size: 1-2 μm, manufactured by Matsumura Sangyo K.K.
[7] Suzulight Mica 200 HK, 200 mesh passed, manufactured by Kuraray Co., Ltd.
[8] Tismo D, diameter: 0.2-0.5 μm, length: 10-20 μm, manufactured by Ohtsuka Kagaku K.K.

EXAMPLES 31-33

Fiber-reinforced polymer compositions were produced in proportions shown in Table 14 under the same conditions as in Examples 26-28 except for substituting high-density polyethylene (J-6311 manufactured by Tonen Sekiyu Kagaku K.K.) for polypropylene, and also using the above polyethylene modified with carboxylic acids shown in Table 14 as the modified polyethylene, and the same measurements as in Examples 26-28 were conducted. The results are shown in Table 14.

TABLE 14

|  | Example No. 31 | 32 | 33 |
|---|---|---|---|
| COMPOSITION (wt. %)[1] | | | |
| Nylon 66[2] | 60 | 60 | 60 |
| Polyethylene[3] | 35 | 35 | 35 |
| Modified Polyethylene[4] | | | |
| Grafted Acid Content | 0.2 | 0.2 | 0.2 |
| Content | 5 | 5 | 5 |
| Glass Fiber[5] | 35 | 35 | 35 |
| Molar Ratio of Amino Group/Carboxyl Group | 20 | 20 | 20 |
| Average Size of Polyethylene Domain (μm) | 3 | 3 | 3 |
| Inorganic Filler | | | |
| Talc[6] | 5 | 0 | 0 |
| Mica[7] | 0 | 5 | 0 |
| Potassium Titanate[8] | 0 | 0 | 5 |
| PROPERTIES | | | |

TABLE 14-continued

| | Example No. | | |
|---|---|---|---|
| | 31 | 32 | 33 |
| MFR (g/10 minutes) | 15 | 13 | 15 |
| Thermal Deformation Temp. (°C.) | 240 | 240 | 240 |
| Under Dry Conditions | | | |
| Tensile Strength (kg/cm²) | | | |
| (23° C.) | 2000 | 2000 | 2000 |
| (140° C.) | 1200 | 1200 | 1200 |
| Flexural Modulus (kg/cm²) | | | |
| (23° C.) | 82000 | 82000 | 81000 |
| (140° C.) | 35000 | 35000 | 35000 |
| Izod Impact Strength (kg · cm/cm) | | | |
| (23° C.) | 15 | 15 | 15 |
| (−40° C.) | 14 | 14 | 14 |
| Under Water-Absorbed Conditions | | | |
| Tensile Strength (kg/cm²) (23° C.) | 1600 | 1600 | 1600 |
| Flexural Modulus (kg/cm²) (23° C.) | 64000 | 64000 | 63000 |
| Izod Impact Strength (kg · cm/cm) (23° C.) | 17 | 17 | 17 |
| Antifreeze Resistance (%) | 90 | 90 | 90 |

Note:
[1]The contents of nylon, polyethylene and modified polyethylene are expressed by weight % based upon resin components, and the contents of glass fibers and inorganic fillers are expressed by weight % based upon the total composition.
[2], [5]-[8]Same as in Table 13.
[3]High-density polyethylene (J-6311 manufactured by Tonen Sekiyu Kagaku K.K.)
[4]High-density polyethylene (J-6311) modified with maleic anhydride.

As is clear from the above results in Tables 13 and 14, the fiber-reinforced polymer compositions of the present invention contain not only the unsaturated carboxylic acid-modified polypropylene or polyethylene serving to increase the compatibility of the polyamide resin and the polypropylene or polyethylene, but also the above inorganic fillers, they show excellent mechanical properties such as tensile strength, flexural modulus and impact strength.

EXAMPLES 34-40, COMPARATIVE EXAMPLE 22

Nylon, polypropylene, modified polypropylene and nucleating agents were dry-blended in a high-speed mixer in proportions shown in Table 15, and introduced into a double-screw extruder of 45 mm in inner diameter shown in FIG. 1 through its main hopper. The chopped strands of the glass fibers (average diameter: 13 μm, average length: 3 mm) were introduced in proportions shown in Table 15 into the double-screw extruder through its second hopper. They were blended at 280° C. to provide composition pellets.

The resulting composition pellets were dried in a drying furnace and then injection-molded to provide test pieces to measure their properties. The results are shown in Table 15.

TABLE 15

| | Example | | | | | | | Comparative Example |
|---|---|---|---|---|---|---|---|---|
| | 34 | 35 | 36 | 37 | 38 | 39 | 40 | 22 |
| COMPOSITION (wt. %)[1] | | | | | | | | |
| Nylon 66[2] | 60 | 60 | 60 | 60 | 60 | 60 | 60 | 60 |
| Polypropylene[3] | 35 | 35 | 35 | 35 | 35 | 35 | 35 | 35 |
| Modified Polypropylene[4] | | | | | | | | |
| Grafted Acid Content | 0.2 | 0.2 | 0.2 | 0.2 | 0.2 | 0.2 | 0.2 | 0.2 |
| Content | 5 | 5 | 5 | 5 | 5 | 5 | 5 | 5 |
| Glass Fiber[5] | 35 | 35 | 35 | 35 | 35 | 35 | 35 | 35 |
| Molar Ratio of Amino Group/Carboxyl Group | 20 | 20 | 20 | 20 | 20 | 20 | 20 | 20 |
| Average Size of Polypropylene Domain (μm) | 2 | 2 | 2 | 2 | 2 | 2 | 2 | 2 |
| Nucleating Agent | | | | | | | | |
| A[6] | 0 | 0 | 0 | 0.5 | 0 | 0 | 0 | 0 |
| B[7] | 0.05 | 0.5 | 1.0 | 0 | 0 | 0.5 | 0.01 | 5 |
| C[8] | 0 | 0 | 0 | 0 | 0.5 | 0.5 | 0 | 0 |
| PROPERTIES | | | | | | | | |
| MFR (g/10 minutes) | 14 | 14 | 14 | 14 | 14 | 14 | 14 | 14 |
| Thermal Deformation Temp. (°C.) | 240 | 240 | 240 | 240 | 240 | 240 | 240 | 240 |
| Under Dry Conditions | | | | | | | | |
| Tensile Strength (kg/cm²) | | | | | | | | |
| (23° C.) | 2300 | 2300 | 2300 | 2300 | 2300 | 2300 | 2300 | 2300 |
| (140° C.) | 1100 | 1100 | 1100 | 1100 | 1100 | 1100 | 1100 | 1100 |
| Flexural Modulus (kg/cm²) | | | | | | | | |
| (23° C.) | 90000 | 93000 | 93000 | 90000 | 90000 | 94000 | 82000 | 90000 |
| (140° C.) | 40000 | 42000 | 42000 | 40000 | 40000 | 43000 | 30000 | 40000 |
| Izod Impact Strength (kg · cm/cm) | | | | | | | | |
| (23° C.) | 20 | 23 | 24 | 20 | 20 | 24 | 16 | 23 |
| (−40° C.) | 15 | 16 | 17 | 15 | 15 | 18 | 12 | 16 |
| Under Water-Absorbed Conditions | | | | | | | | |
| Tensile Strength (kg/cm²) | 1500 | 1500 | 1500 | 1500 | 1500 | 1500 | 1500 | 1500 |

TABLE 15-continued

|  | Example | | | | | | | Comparative Example |
|---|---|---|---|---|---|---|---|---|
|  | 34 | 35 | 36 | 37 | 38 | 39 | 40 | 22 |
| (23° C.) | | | | | | | | |
| Flexural Modulus (kg/cm²) (23° C.) | 70000 | 72000 | 72000 | 70000 | 70000 | 73000 | 61000 | 70000 |
| Izod Impact Strength (kg · cm/cm) (23° C.) | 23 | 26 | 27 | 23 | 23 | 26 | 18 | 25 |
| Antifreeze Resistance (%) | 88 | 88 | 89 | 87 | 88 | 88 | 85 | 88 |

Note
[1]The contents of nylon, polypropylene and modified polypropylene are expressed by weight % based upon resin components, and the contents of glass fibers and nucleating agents are expressed by weight % based upon the total composition.
[2]Amiran CM 3001N manufactured by Toray Industries, Inc. and containing end amino groups in an amount of 0.034 milliequivalent/g measured according to a Korshak-Zamyationa method (back titration method) (Chem. Abs. 40, 4665, '46, ibid 42, 6152, '48).
[3]J-215 manufactured by Tonen Sekiyu Kagaku K.K.
[4]Maleic anhydride-modified polypropylene.
[5]MA03FT-2 manufactured by Asahi Fiber Glass K.K.
[6]Sodium benzoate.
[7]Aluminum P-tert-butyl monohydroxybenzoate.
[8]Dibenzylidene sorbitol.

EXAMPLES 41-43

Fiber-reinforced polymer compositions were produced in proportions shown in Table 16 under the same conditions as in Examples 34-36 except for substituting high-density polyethylene (J-6311 manufactured by Tonen Sekiyu Kagaku K.K.) for polypropylene, and also using the above high-density polyethylene modified with carboxylic acids shown in Table 16 as the modified polyethylene, and the same measurements as in Examples 34-36 were conducted. The results are shown in Table 16.

TABLE 16

|  | Example No. | | |
|---|---|---|---|
|  | 41 | 42 | 43 |
| COMPOSITION (wt. %)[1] | | | |
| Nylon 66[2] | 60 | 60 | 60 |
| Polyethylene[3] | 35 | 35 | 35 |
| Modified Polyethylene[4] | | | |
| Grafted Acid Content | 0.2 | 0.2 | 0.2 |
| Content | 5 | 5 | 5 |
| Glass Fiber[5] | 35 | 35 | 35 |
| Molar Ratio of Amino Group/Carboxyl Group | 20 | 20 | 20 |
| Average Size of Polyethylene Domain (μm) | 3 | 3 | 3 |
| Nucleating Agent | | | |
| A[6] | 0 | 0 | 0 |
| B[7] | 0.05 | 0.5 | 1.0 |
| C[8] | 0 | 0 | 0 |
| PROPERTIES | | | |
| MFR (g/10 minutes) | 16 | 16 | 16 |
| Thermal Deformation Temp. (°C.) | 240 | 240 | 240 |
| Under Dry Conditions | | | |
| Tensile Strength (kg/cm²) | | | |
| (23° C.) | 1900 | 1900 | 1900 |
| (140° C.) | 900 | 900 | 900 |
| Flexural Modulus (kg/cm²) | | | |
| (23° C.) | 80000 | 82000 | 83000 |
| (140° C.) | 35000 | 36000 | 36000 |
| Izod Impact Strength (kg · cm/cm) | | | |
| (23° C.) | 25 | 26 | 26 |
| (−40° C.) | 20 | 20 | 21 |
| Under Water-Absorbed Conditions | | | |
| Tensile Strength (kg/cm²) (23° C.) | 1500 | 1500 | 1500 |
| Flexural Modulus | 60000 | 60000 | 61000 |
| (kg/cm²) (23° C.) | | | |
| Izod Impact Strength (kg · cm/cm) (23° C.) | 28 | 28 | 29 |
| Antifreeze Resistance (%) | 90 | 90 | 90 |

Note:
[1]The contents of nylon, polyethylene and modified polyethylene are expressed by weight % based upon resin components, and the contents of glass fibers and nucleating agents are expressed by weight % based upon the total composition.
[2], [5]-[8]Same as in Table 15.
[3]High-density polyethylene (J-6311 manufactured by Tonen Sekiyu Kagaku K.K.).
[4]High-density polyethylene (J-6311) modified with maleic anhydride.

As is clear from the above results, since the fiber-reinforced polymer compositions of the present invention contain not only the unsaturated carboxylic acid-modified polypropylene or polyethylene serving to increase the compatibility of the polyamide resin and the polypropylene or polyethylene, but also the above nucleating agents, they show excellent mechanical strength, heat resistance, moldability, antifreeze resistance, etc., and their impact resistance and modulus are remarkably improved.

EXAMPLES 44-49

Nylon 66, nylon 6, polypropylene and modified polypropylene were dry-blended in a high-speed mixer in proportions shown in Table 17, and introduced into a double-screw extruder of 45 mm in inner diameter shown in FIG. 1 through its main hopper. The chopped strands of the glass fibers (average diameter: 13 μm, average length: 3 mm) were introduced in proportions shown in Table 17 into the double-screw extruder through its second hopper. They were blended at 280° C. to provide composition pellets.

The resulting composition pellets were dried in a drying furnace and then injection-molded to provide test pieces to measure their properties. The results are shown in Table 17.

TABLE 17

| Example No. | 44 | 45 | 46 |
|---|---|---|---|
| COMPOSITION (wt. %)[1] | | | |
| Nylon 66[2] | 50 | 40 | 30 |
| Nylon 6[3] | 10 | 20 | 30 |
| Polypropylene[4] | 35 | 35 | 35 |

TABLE 17-continued

| Modified Polypropylene[5] | | | | |
|---|---|---|---|---|
| Grafted Acid Content | | 0.2 | 0.2 | 0.2 |
| Content | | 5 | 5 | 5 |
| Glass Fiber[6] | | 35 | 35 | 35 |
| Molar Ratio of Amino Group/Carboxyl Group | | 20 | 21 | 21 |
| Average Size of Polypropylene Domain ($\mu$m) | | 2 | 2 | 2 |
| PROPERTIES | | | | |
| MFR (g/10 minutes) | | 8.5 | 8.0 | 8.8 |
| Thermal Deformation Temp. (°C.) | | 230 | 220 | 210 |
| Under Dry Conditions | | | | |
| Tensile Strength (kg/cm$^2$) | (23° C.) | 1600 | 1500 | 1500 |
| | (140° C.) | 700 | 600 | 600 |
| Flexural Modulus (kg/cm$^2$) | (23° C.) | 70000 | 70000 | 67000 |
| | (140° C.) | 25000 | 24000 | 21000 |
| Izod Impact Strength (kg · cm/cm) | (23° C.) | 20 | 25 | 27 |
| | (−40° C.) | 17 | 18 | 20 |
| Under Water-Absorbed Conditions | | | | |
| Tensile Strength (kg/cm$^2$) | (23° C.) | 1000 | 1000 | 1000 |
| Flexural Modulus (kg/cm$^2$) | (23° C.) | 50000 | 50000 | 48000 |
| Izod Impact Strength (kg · cm/cm) | (23° C.) | 23 | 28 | 29 |
| Antifreeze Resistance (%) | | 85 | 80 | 80 |

| Example No. | | 47 | 48 | 49 |
|---|---|---|---|---|
| COMPOSITION (wt. %)[1] | | | | |
| Nylon 66[2] | | 40 | 40 | 10 |
| Nylon 6[3] | | 20 | 20 | 50 |
| Polypropylene[4] | | 38.8 | 28 | 35 |
| Modified Polypropylene[5] | | | | |
| Grafted Acid Content | | 0.2 | 0.25 | 0.2 |
| Content | | 1.2 | 12 | 5 |
| Glass Fiber[6] | | 35 | 35 | 35 |
| Molar Ratio of Amino Group/Carboxyl Group | | 83 | 10 | 22 |
| Average Size of Polypropylene Domain ($\mu$m) | | 4 | 0.8 | 2 |
| PROPERTIES | | | | |
| MFR (g/10 minutes) | | 15 | 0.5 | 8.0 |
| Thermal Deformation Temp. (°C.) | | 220 | 210 | 190 |
| Under Dry Conditions | | | | |
| Tensile Strength (kg/cm$^2$) | (23° C.) | 1500 | 1400 | 1300 |
| | (140° C.) | 600 | 550 | 500 |
| Flexural Modulus (kg/cm$^2$) | (23° C.) | 70000 | 68000 | 50000 |
| | (140° C.) | 24000 | 22000 | 10000 |
| Izod Impact Strength (kg · cm/cm) | (23° C.) | 25 | 24 | 10 |
| | (−40° C.) | 18 | 17 | 8 |
| Under Water-Absorbed Conditions | | | | |
| Tensile Strength (kg/cm$^2$) | (23° C.) | 1000 | 950 | 700 |
| Flexural Modulus (kg/cm$^2$) | (23° C.) | 50000 | 49000 | 35000 |
| Izod Impact Strength (kg · cm/cm) | (23° C.) | 28 | 27 | 12 |
| Antifreeze Resistance (%) | | 80 | 80 | 60 |

Note:
[1]The contents of nylon 66, nylon 6, polypropylene and modified polypropylene are expressed by weight % based upon resin components, and the content of glass fibers is expressed by weight % based upon the total composition.
[2]Amiran CM 3001N manufactured by Toray Industries, Inc. and containing end amino groups in an amount of 0.034 milliequivalent/g measured according to a Korshak-Zamyationa method (back titration method) (Chem. Abs. 40, 4665, '46, ibid 42, 6152, '48).
[3]Amiran CM1017 manufactured by Toray Industries, Inc. and containing end amino groups in an amount of 0.040 milliequivalent/g measured according to the same Korshak-Zamyationa method as in (2).
[4]J-215 manufactured by Tonen Sekiyu Kagaku K.K.
[5]Maleic anhydride-modified polypropylene.
[6]MA03FT-2 manufactured by Asahi Fiber Glass K.K.

EXAMPLES 50 AND 51

Fiber-reinforced polymer compositions were produced in proportions shown in Table 18 under the same conditions as in Examples 44 and 45 except for substituting high-density polyethylene (J-6311 manufactured by Tonen Sekiyu Kagaku K.K.) for polypropylene, and also using the above high-density polyethylene modified with carboxylic acids shown in Table 18 as the modified polyethylene, and the same measurements as in Examples 44 and 45 were conducted. The results are shown in Table 18.

TABLE 18

| Example No. | | 50 | 51 |
|---|---|---|---|
| COMPOSITION (wt. %)[1] | | | |
| Nylon 66[2] | | 50 | 40 |
| Nylon 6[3] | | 10 | 20 |
| Polyethylene[4] | | 35 | 35 |
| Modified Polyethylene[5] | | | |
| Grafted Acid Content | | 0.2 | 0.2 |
| Content | | 5 | 5 |
| Glass Fiber[6] | | 35 | 35 |
| Molar Ratio of Amino Group/Carboxyl Group | | 20 | 20 |
| Average Size of Polyethylene Domain ($\mu$m) | | 3 | 3 |
| PROPERTIES | | | |
| MFR (g/10 minutes) | | 12 | 10 |
| Thermal Deformation Temp. (°C.) | | 230 | 220 |
| Under Dry Conditions | | | |
| Tensile Strength (kg/cm$^2$) | (23° C.) | 1300 | 1200 |
| | (140° C.) | 500 | 450 |
| Flexural Modulus (kg/cm$^2$) | (23° C.) | 68000 | 66000 |
| | (140° C.) | 20000 | 19000 |
| Izod Impact Strength (kg · cm/cm) | (23° C.) | 25 | 28 |
| | (−40° C.) | 20 | 22 |
| Under Water-Absorbed Conditions | | | |
| Tensile Strength (kg/cm$^2$) | (23° C.) | 1000 | 900 |
| Flexural Modulus (kg/cm$^2$) | (23° C.) | 40000 | 39000 |
| Izod Impact Strength (kg · cm/cm) | (23° C.) | 28 | 30 |
| Antifreeze Resistance (%) | | 90 | 85 |

Note:
[1]The contents of nylon 66, nylon 6, polyethylene and modified polyethylene are expressed by weight % based upon resin components, and the content of glass fibers is expressed by weight % based upon the total composition.
[2], [3], [6]Same as in Table 17.
[4]High-density polyethylene (J-6311 manufactured by Tonen Sekiyu Kagaku K.K.)
[5]High-density polyethylene (J-6311) modified with maleic anhydride.

As is clear from the above results in Tables 17 and 18, since the fiber-reinforced polymer compositions of the present invention not only contain the unsaturated carboxylic acid-modified polypropylene or polyethylene serving to increase the compatibility of the polyamide resin and the polypropylene or polyethylene, but also using nylon 66 and nylon 6 in the above proportion as the polyamide resins, they show remarkably improved impact resistance.

EXAMPLES 52-58

Nylon 46, nylon 66, nylon 6, polypropylene and modified polypropylene were dry-blended in a high-speed mixer in proportions shown in Table 19, and introduced into a double-screw extruder of 45 mm in inner diameter shown in FIG. 1 through its main hopper. The chopped strands of the glass fibers (average diameter: 13 $\mu$m, average length: 3 mm) were introduced in proportions shown in Table 19 into the double-screw extruder through its second hopper. They were blended at 300° C. to provide composition pellets.

The resulting composition pellets were dried in a drying furnace and then injection-molded to provide test pieces to measure their properties. The results are shown in Table 19.

TABLE 19

| Example No. | | 52 | 53 | 54 | 55 |
|---|---|---|---|---|---|
| COMPOSITION (wt. %)[1] | | | | | |
| Nylon 46[2] | | 30 | 50 | 60 | 30 |
| Nylon 66[3] | | 30 | 10 | 0 | 15 |
| Nylon 6[4] | | 0 | 0 | 0 | 15 |
| Polypropylene[5] | | 35 | 35 | 35 | 35 |
| Modified Polypropylene[6] | | | | | |
| Grafted Acid Content | | 0.2 | 0.2 | 0.2 | 0.2 |
| Content | | 5 | 5 | 5 | 5 |
| Glass Fiber[7] | | 35 | 35 | 35 | 35 |
| Molar Ratio of Amino Group/Carboxyl Group | | 17 | 15 | 14 | 18 |
| Average size of Polypropylene Domain (μm) | | 1.5 | 1 | 1 | 2 |
| PROPERTIES | | | | | |
| Thermal Deformation Temp. (°C.) | | 260 | 270 | 280 | 255 |
| Under Dry Conditions | | | | | |
| Tensile Strength | (23° C.) | 2350 | 2350 | 2400 | 2000 |
| (kg/cm²) | (140° C.) | 1300 | 1400 | 1500 | 1300 |
| Flexural Modulus | (23° C.) | 83000 | 84000 | 85000 | 70000 |
| (kg/cm²) | (140° C.) | 40000 | 42000 | 50000 | 35000 |
| Izod Impact | (23° C.) | 16 | 16 | 16 | 14 |
| Strength | (−40° C.) | 12 | 12 | 12 | 10 |
| (kg · cm/cm) | | | | | |
| Under Water-Absorbed Conditions | | | | | |
| Tensile Strength | (23° C.) | 1500 | 1500 | 1500 | 1500 |
| (kg/cm²) | | | | | |
| Flexural Modulus | (23° C.) | 62000 | 62000 | 62000 | 57000 |
| (kg/cm²) | | | | | |
| Izod Impact Strength | (23° C.) | 19 | 19 | 19 | 17 |
| (kg · cm/cm) | | | | | |
| Antifreeze Resistance (%) | | 85 | 85 | 85 | 85 |

| Example No. | | 56 | 57 | 58 |
|---|---|---|---|---|
| COMPOSITION (wt. %)[1] | | | | |
| Nylon 46[2] | | 30 | 5 | 0 |
| Nylon 66[3] | | 0 | 55 | 0 |
| Nylon 6[4] | | 30 | 0 | 60 |
| Polypropylene[5] | | 35 | 35 | 35 |
| Modified Polypropylene[6] | | | | |
| Grafted Acid Content | | 0.2 | 0.2 | 0.2 |
| Content | | 5 | 5 | 5 |
| Glass Fiber[7] | | 35 | 35 | 35 |
| Molar Ratio of Amino Group/Carboxyl Group | | 19 | 20 | 23 |
| Average Size of Polypropylene Domain (μm) | | 2 | 2 | 2 |
| PROPERTIES | | | | |
| Thermal Deformation Temp. (°C.) | | 250 | 240 | 190 |
| Under Dry Conditions | | | | |
| Tensile Strength | (23° C.) | 1800 | 2300 | 1400 |
| (kg/cm²) | (140° C.) | 1200 | 1100 | 550 |
| Flexural Modulus | (23° C.) | 65000 | 82000 | 50000 |
| (kg/cm²) | (140° C.) | 30000 | 30000 | 10000 |
| Izod Impact | (23° C.) | 13 | 16 | 10 |
| Strength | (−40° C.) | 10 | 12 | 8 |
| (kg · cm/cm) | | | | |
| Under Water-Absorbed Conditions | | | | |
| Tensile Strength | (23° C.) | 1200 | 1500 | 1000 |
| (kg/cm²) | | | | |
| Flexural Modulus | (23° C.) | 50000 | 61000 | 40000 |
| (kg/cm²) | | | | |
| Izod Impact Strength | (23° C.) | 16 | 18 | 12 |
| (kg · cm/cm) | | | | |

TABLE 19-continued

| Antifreeze Resistance (%) | 60 | 85 | 60 |
|---|---|---|---|

Note:
[1] The contents of nylon 46, nylon 66, nylon 6, polypropylene and modified polypropylene are expressed by weight % based upon resin components, and the content of glass fibers is expressed by weight % based upon the total composition.
[2] Unitika Nylon 46 manufactured by Unitika Ltd. and containing end amino groups in an amount of 0.026 milliequivalent/g measured according to a Korshak-Zamyationa method (back titration method) (Chem. Abs. 40, 4665, '46, ibid 42, 6152, '48).
[3] Amiran CM 3001N manufactured by Toray Industries, Inc. and containing end amino groups in an amount of 0.034 milliequivalent/g measured according to the same Korshak-Zamyationa method as in (2).
[4] A1030BRT manufactured by Unitika Ltd. and containing end amino groups in an amount of 0.042 milliequivalent/g measured according to the same Korshak-Zamyationa method as in (2).
[5] J-215 manufactured by Tonen Sekiyu Kagaku K.K.
[6] Maleic anhydride-modified polypropylene.
[7] MA03FT-2 manufactured by Asahi Fiber Glass K.K.

EXAMPLES 59 AND 60

Fiber-reinforced polymer compositions were produced in proportions shown in Table 20 under the same conditions as in Examples 52 and 53 except for substituting high-density polyethylene (J-6311 manufactured by Tonen Sekiyu Kagaku K.K.) for polypropylene, and also using the above high-density polyethylene modified with carboxylic acids shown in Table 20 as the modified polyethylene, and the same measurements as in Examples 52 and 53 were conducted. The results are shown in Table 20.

TABLE 20

| Example No. | | 59 | 60 |
|---|---|---|---|
| COMPOSITION (wt. %)[1] | | | |
| Nylon 46[2] | | 30 | 60 |
| Nylon 66[3] | | 30 | 0 |
| Nylon 6[4] | | 0 | 0 |
| Polyethylene[5] | | 35 | 35 |
| Modified Polyethylene[6] | | | |
| Grafted Acid Content | | 0.2 | 0.2 |
| Content | | 5 | 5 |
| Glass Fiber[7] | | 35 | 35 |
| Molar Ratio of Amino Group/Carboxyl Group | | 17 | 14 |
| Average Size of Polyethylene Domain (μm) | | 3 | 2.5 |
| PROPERTIES | | | |
| Thermal Deformation Temp. (°C.) | | 260 | 280 |
| Under Dry Conditions | | | |
| Tensile Strength | (23° C.) | 2000 | 2100 |
| (kg/cm²) | (140° C.) | 1350 | 1400 |
| Flexural Modulus | (23° C.) | 80000 | 82000 |
| (kg/cm²) | (140° C.) | 38000 | 40000 |
| Izod Impact Strength | (23° C.) | 20 | 20 |
| (kg · cm/cm) | (−40° C.) | 18 | 18 |
| Under Water-Absorbed Conditions | | | |
| Tensile Strength | (23° C.) | 1600 | 1700 |
| (kg/cm²) | | | |
| Flexural Modulus | (23° C.) | 61000 | 63000 |
| (kg/cm²) | | | |
| Izod Impact Strength | (23° C.) | 25 | 25 |
| (kg · cm/cm) | | | |
| Antifreeze Resistance (%) | | 90 | 90 |

Note:
[1] The contents of nylon 46, nylon 66, nylon 6, polyethylene and modified polyethylene are expressed by weight % based upon resin components, and the content of glass fibers is expressed by weight % based upon the total composition.
[2]–[4], [7] Same as in Table 19.
[5] High-density polyethylene (J-6311 manufactured by Tonen Sekiyu Kagaku K.K.).
[6] High-density polyethylene (J-6311) modified with maleic anhydride.

As is clear from the above results in Tables 19 and 20, since the fiber-reinforced polymer compositions of the present invention not only contain the unsaturated carboxylic acid-modified polypropylene or polyethylene serving to increase the compatibility of the polyamide resin and the polypropylene or polyethylene, but also using nylon 46 and if necessary, nylon 66 and/or nylon 6 as the polyamide resins, they show excellent mechanical strength, moldability, antifreeze resistance, etc., and their heat resistance and creep resistance are remarkably improved.

EXAMPLES 61–70

Nylon 12, nylon 612, nylon 11, nylon 66, nylon 6, polypropylene and modified polypropylene were dry-blended in a high-speed mixer in proportions shown in Table 21, and introduced into a double-screw extruder of 45 mm in inner diameter shown in FIG. 1 through its main hopper. The chopped strands of the glass fibers (average diameter: 13 μm, average length: 3 mm) were introduced in proportions shown in Table 21 into the double-screw extruder through its second hopper. They were blended at 230° C. (or 280° C. when nylon 66 or nylon 6 was contained) to provide composition pellets.

The resulting composition pellets were dried in a drying furnace and then injection-molded to provide test pieces to measure their properties. The results are shown in Table 21.

TABLE 21

| Example No. | | 61 | 62 | 63 | 64 | 65 |
|---|---|---|---|---|---|---|
| COMPOSITION (wt. %)[1] | | | | | | |
| Nylon 12[2] | | 30 | 50 | 60 | 30 | 30 |
| Nylon 612[3] | | 0 | 0 | 0 | 0 | 0 |
| Nylon 11[4] | | 0 | 0 | 0 | 0 | 0 |
| Nylon 66[5] | | 30 | 10 | 0 | 15 | 0 |
| Nylon 6[6] | | 0 | 0 | 0 | 15 | 30 |
| Polypropylene[7] | | 35 | 35 | 35 | 35 | 35 |
| Modified Polypropylene[8] | | | | | | |
| Grafted Acid Content | | 0.2 | 0.2 | 0.2 | 0.2 | 0.2 |
| Content | | 5 | 5 | 5 | 5 | 5 |
| Glass Fiber[9] | | 35 | 35 | 35 | 35 | 35 |
| Molar Ratio of Amino Group/Carboxyl Group | | 14 | 11 | 10 | 15 | 16 |
| Average Size of Polypropylene Domain (μm) | | 1 | 0.8 | 0.7 | 1 | 1 |
| PROPERTIES | | | | | | |
| MFR (g/10 minutes) | | 23 | 23 | 25 | 20 | 18 |
| Thermal Deformation Temp. (°C.) | | 230 | 190 | 180 | 205 | 200 |
| Under Dry Conditions | | | | | | |
| Tensile Strength | (23° C.) | 2000 | 1800 | 1800 | 2200 | 2000 |
| (kg/cm$^2$) | (140° C.) | 1000 | 950 | 900 | 850 | 800 |
| Flexural Modulus | (23° C.) | 78000 | 70000 | 68000 | 70000 | 65000 |
| (kg/cm$^2$) | (140° C.) | 26000 | 20000 | 18000 | 18000 | 12000 |
| Izod Impact | (23° C.) | 16 | 17 | 18 | 16 | 16 |
| Strength (kg·cm/cm) | (−40° C.) | 12 | 13 | 14 | 12 | 12 |
| Under Water-Absorbed Conditions | | | | | | |
| Tensile Strength (kg/cm$^2$) | (23° C.) | 1800 | 1900 | 1800 | 1800 | 1800 |
| Flexural Modulus (kg/cm$^2$) | (23° C.) | 65000 | 68000 | 70000 | 65000 | 65000 |
| Izod Impact Strength (kg·cm/cm) | (23° C.) | 17 | 17 | 17 | 17 | 17 |
| Antifreeze Resistance (%) | | 90 | 90 | 90 | 85 | 85 |
| Example No. | | 66 | 67 | 68 | 69 | 70 |
| COMPOSITION (wt. %)[1] | | | | | | |
| Nylon 12[2] | | 0 | 0 | 5 | 0 | 0 |
| Nylon 612[3] | | 0 | 30 | 0 | 0 | 5 |
| Nylon 11[4] | | 30 | 0 | 0 | 5 | 0 |
| Nylon 66[5] | | 30 | 30 | 55 | 55 | 55 |
| Nylon 6[6] | | 0 | 0 | 0 | 0 | 0 |
| Polypropylene[7] | | 35 | 35 | 35 | 35 | 35 |
| Modified Polypropylene[8] | | | | | | |
| Grafted Acid Content | | 0.2 | 0.25 | 0.2 | 0.2 | 0.2 |
| Content | | 5 | 5 | 5 | 5 | 5 |
| Glass Fiber[9] | | 35 | 35 | 35 | 35 | 35 |
| Molar Ratio of Amino Group/Carboxyl Group | | 16 | 18 | 20 | 20 | 20 |
| Average Size of Polypropylene Domain (μm) | | 1 | 2 | 2 | 2 | 2 |
| PROPERTIES | | | | | | |
| MFR (g/10 minutes) | | 25 | 25 | 14 | 14 | 14 |
| Thermal Deformation Temp. (°C.) | | 230 | 230 | 235 | 235 | 235 |
| Under Dry Conditions | | | | | | |
| Tensile Strength | (23° C.) | 2000 | 2000 | 2300 | 2300 | 2300 |
| (kg/cm$^2$) | (140° C.) | 1000 | 1000 | 1100 | 1100 | 1100 |
| Flexural Modulus | (23° C.) | 80000 | 80000 | 82000 | 82000 | 82000 |
| (kg/cm$^2$) | (140° C.) | 27000 | 27000 | 30000 | 30000 | 30000 |
| Izod Impact | (23° C.) | 16 | 16 | 16 | 16 | 16 |
| Strength | (−40° C.) | 12 | 12 | 12 | 12 | 12 |

TABLE 21-continued

| (kg · cm/cm) | | | | | | |
|---|---|---|---|---|---|---|
| Under Water-Absorbed Conditions | | | | | | |
| Tensile Strength | (23° C.) | 1800 | 1800 | 1500 | 1500 | 1500 |
| (kg/cm²) | | | | | | |
| Flexural Modulus | (23° C.) | 65000 | 65000 | 61000 | 61000 | 61000 |
| (kg/cm²) | | | | | | |
| Izod Impact | (23° C.) | 17 | 17 | 18 | 18 | 18 |
| Strength | | | | | | |
| (kg · cm/cm) | | | | | | |
| Antifreeze Resistance (%) | | 90 | 85 | 86 | 86 | 86 |

Note:
[1] The contents of nylon 12, nylon 612, nylon 11, nylon 66, nylon 6, polypropylene and modified polypropylene are expressed by weight % based upon resin components, and the content of glass fibers is expressed by weight % based upon the total composition.
[2] Diamide L1600 manufactured by Daicel Huels Ltd. and containing end amino groups in an amount of 0.017 milliequivalent/g measured according to a Korshak-Zamyationa method (back titration method) (Chem. Abs. 40, 4665, '46, ibid 42, 6152, '48).
[3] Diamide D-14 manufactured by Daicel Huels Ltd. and containing end amino groups in an amount of 0.028 milliequivalent/g measured according to the same Korshak-Zamyationa method as in (2).
[4] Rilsan BMN manufactured by Toray Industries, Inc. and containing end amino groups in an amount of 0.020 milliequivalent/g measured according to the same Korshak-Zamyationa method as in (2).
[5] Amiran CM 3001N manufactured by Toray Industries, Inc. and containing end amino groups in an amount of 0.034 milliequivalent/g measured according to the same Korshak-Zamyationa method as in (2).
[6] A1030BRT manufactured by Unitika Ltd. and containing end amino groups in an amount of 0.042 milliequivalent/g measured according to the same Korshak-Zamyationa method as in (2).
[7] J-215 manufactured by Tonen Sekiyu Kagaku K.K.
[8] Maleic anhydride-modified polypropylene.
[9] MA03FT-2 manufactured by Asahi Fiber Glass K.K.

EXAMPLES 71 and 72

Fiber-reinforced polymer compositions were produced in proportions shown in Table 22 under the same conditions as in Examples 61 and 62 except for substituting high-density polyethylene (J-6311 manufactured by Tonen Sekiyu Kagaku K.K.) for polypropylene, and also using the above high-density polyethylene modified with carboxylic acids shown in Table 22 as the modified polyethylene, and the same measurements as in Examples 61 and 62 were conducted. The results are shown in Table 22.

TABLE 22

| Example No. | | 71 | 72 |
|---|---|---|---|
| COMPOSITION (wt. %)[1] | | | |
| Nylon 12[2] | | 30 | 0 |
| Nylon 612[3] | | 0 | 30 |
| Nylon 11[4] | | 0 | 0 |
| Nylon 66[5] | | 30 | 30 |
| Nylon 6[6] | | 0 | 0 |
| Polyethylene[7] | | 35 | 35 |
| Modified Polyethylene[8] | | | |
| Grafted Acid Content | | 0.2 | 0.2 |
| Content | | 5 | 5 |
| Glass Fiber[9] | | 35 | 35 |
| Molar Ratio of Amino Group/ | | 14 | 18 |
| Carboxyl Group | | | |
| Average Size of | | 2.5 | 3 |
| Polyethylene Domain (μm) | | | |
| PROPERTIES | | | |
| MFR (g/10 minutes) | | 22 | 25 |
| Thermal Deformation Temp. | | 225 | 230 |
| (°C.) | | | |
| Under Dry Conditions | | | |
| Tensile Strength | (23° C.) | 1700 | 1700 |
| (kg/cm²) | (140° C.) | 800 | 800 |
| Flexural Modulus | (23° C.) | 65000 | 66000 |
| (kg/cm²) | (140° C.) | 20000 | 20000 |
| Izod Impact Strength | (23° C.) | 21 | 21 |
| (kg · cm/cm) | (−40° C.) | 18 | 18 |
| Under Water-Absorbed Conditions | | | |
| Tensile Strength | (23° C.) | 1700 | 1700 |
| (kg/cm²) | | | |
| Flexural Modulus | (23° C.) | 60000 | 60000 |
| (kg/cm²) | | | |
| Izod Impact Strength | (23° C.) | 21 | 21 |
| (kg · cm/cm) | | | |

TABLE 22-continued

| Example No. | 71 | 72 |
|---|---|---|
| Antifreeze Resistance (%) | 90 | 90 |

Note:
[1] The contents of nylon 12, nylon 612, nylon 11, nylon 66, nylon 6, polyethylene and modified polyethylene are expressed by weight % based upon resin components, and the content of glass fibers is expressed by weight % based upon the total composition.
[2]–[6], [9] Same as in Table 21.
[7] High-density polyethylene (J-6311) manufactured by Tonen Sekiyu Kagaku K.K.)
[8] High-density polyethylene (J-6311) modified with maleic anhydride.

As is clear from the above results in Tables 21 and 22, since the fiber-reinforced polymer compositions of the present invention not only contain the unsaturated carboxylic acid-modified polypropylene or polyethylene serving to increase the compatibility of the polyamide resin and the polypropylene or polyethylene, but also using nylon 12, nylon 612 or nylon 11, and further nylon 66 and/or nylon 6, if necessary, they show excellent moldability, chemical resistance, antifreeze resistance, water absorption resistance, etc.

The fiber-reinforced polymer compositions of the present invention are highly suitable for containers such as radiator tanks of automobiles, parts disposed near automobile engines, parts of electric appliances, etc.

What is claimed is:

1. A method of producing a fiber-reinforced polymer composition containing a polyamide resin, polyolefin, unsaturated carboxylic acid-modified polyolefin and glass fibers, comprising using a double-screw extruder having in sequence a first hopper, a second hopper, a vent and a die exit and having a length/inner diameter (L/D) ratio of at least 25; introducing resin components containing said polyamide resin, said polyolefin and said unsaturated carboxylic acid-modified polyolefin into said double-screw extruder through said first hopper; kneading said resin components at 290°–320° C. in at least one first kneading zone constituted by at least four continuously arranged kneading discs before reaching a second hopper zone; introducing said glass fibers through said second hopper; and kneading said resin components with said glass fibers in at least one second kneading zone constituted by at least four continuously arranged kneading discs before reaching a vent zone.

2. A double-screw extruder for producing a fiber-reinforced polymer composition containing a polyamide resin, polyolefin, unsaturated carboxylic acid-modified polyolefin and glass fibers, said double-screw extruder having a length/inner diameter (L/D) ratio of at least 25, and comprising in sequence a first hopper for introducing resin components containing said polyamide resin, said polyolefin and said unsaturated carboxylic acid-modified polyolefin and said unsaturated carboxylic acid-modified polyolefin, a second hopper for introducing said glass fibers, a vent and a die exit, and further comprising at least one first kneading zone, upstream of said second hopper, constituted by at least four continuously arranged kneading discs for kneading said resin components, and at least one second kneading zone constituted by at least four continuously arranged kneading discs between said second hopper and said vent for kneading said resin components and said glass fibers.

3. The double-screw extruder according to claim 2, wherein said kneading disc has an L/D ratio of $\frac{1}{4}-\frac{1}{8}$.

4. The double-screw extruder according to claim 2 comprising 2-4 first kneading zones.

5. The double-screw extruder according to claim 2 comprising 2-4 first kneading zones.

6. The double-screw extruder according to claim 3 comprising 2-4 first kneading zones.

* * * * *